(12) United States Patent
Faroudja et al.

(10) Patent No.: US 6,222,589 B1
(45) Date of Patent: Apr. 24, 2001

(54) DISPLAYING VIDEO ON HIGH-RESOLUTION COMPUTER-TYPE MONITORS SUBSTANTIALLY WITHOUT MOTION DISCONTINUITIES

(75) Inventors: Yves C. Faroudja, 26595 Anacapa Dr., Los Altos Hills, CA (US) 94022; Xu Dong, San Jose; Dong Wei, Sunnyvale, both of CA (US)

(73) Assignee: Yves C. Faroudja, Los Altos Hills, CA (US)

( * ) Notice: Subject to any disclaimer, the term of this patent is extended or adjusted under 35 U.S.C. 154(b) by 0 days.

(21) Appl. No.: 08/695,837

(22) Filed: Aug. 8, 1996

(51) Int. Cl.⁷ .................................................. H04N 7/01

(52) U.S. Cl. .................... 348/448; 348/459; 345/154; 345/132

(58) Field of Search ..................... 348/446, 447, 348/448, 451, 452, 449, 441, 459; 345/132, 154

(56) References Cited

U.S. PATENT DOCUMENTS

| 4,864,398 | 9/1989 | Avis et al. . |
| 4,876,596 | 10/1989 | Faroudja . |
| 4,967,271 | 10/1990 | Campbell et al. . |
| 4,982,280 | 1/1991 | Lyon et al. . |
| 4,989,090 | 1/1991 | Campbell et al. . |
| 4,998,167 | 3/1991 | Jaqua . |

(List continued on next page.)

FOREIGN PATENT DOCUMENTS

| 2023669 | 6/1990 | (CA) . |
| 0600446 | 11/1993 | (EP) . |
| 9524100 | 9/1995 | (WO) . |

OTHER PUBLICATIONS

*Television Engineering Handbook,* Revised Edition, edited by K. Blair Benson, revised by Jerry Whitaker; McGraw–Hill, Inc., San Francisco, 1992, pp. 19.5, 19.6.

*Video Demystified,* Keith Jack; Hightext Publications, Inc., Solana Beach, California, 1993 pp. 7–26 and pp. 358–372.

"Challenges in Full–Motion Video/Audio for Personal Computers" Edwin J. Kroeker; *SMPTE Journal* Jan. 1993, pp. 24–31.

(List continued on next page.)

*Primary Examiner*—Andrew I. Faile
*Assistant Examiner*—Reuben M. Brown
(74) *Attorney, Agent, or Firm*—Gallagher & Lathrop; Thomas A. Gallagher

(57) ABSTRACT

A convectional 2-1 interlaced (nominally 50 Hz field rate or nominally 60 Hz field rate) television signal is converted to a form suitable for display on a progressively-scanned variable-frame-rate high-resolution computer-type monitor. First, a succession of progressively-scanned video frames is derived from the interlaced television signal and each frame is repeated at least twice in succession When the interlaced television sign is derived from a motion picture source, the progressively scanned frames are derived by merging opposite polarity fields derived from tho same motion picture frame. For other sources, other interlace-to-progressive scan techniques, such as line duplication or line interpolation, are employed. The sequences of repeated progressively-scanned frames are written into a two frame memory at rate derived from the timing of the progressively-scanned video frames and are read out at a rate derived from the timing of the monitor's frame rate. Frames are skipped or duplicated in order to prevent memory underflow or overflow. Motion-discontinuity-free video displays at refresh rates from 50 Hz to 100 Hz, for 50 Hz inputs, and from 60 Hz to 120 hz for 60 Hz inputs may be achieved.

55 Claims, 14 Drawing Sheets

U.S. PATENT DOCUMENTS

| | | |
|---|---|---|
| 5,068,724 | 11/1991 | Krause et al. . |
| 5,084,755 | 1/1992 | Ozaki . |
| 5,093,720 | 3/1992 | Krause et al. . |
| 5,159,451 | 10/1992 | Faroudja et al. . |
| 5,255,091 | 10/1993 | Lyon et al. . |
| 5,291,280 | 3/1994 | Faroudja et al. . |
| 5,327,243 | 7/1994 | Maietta et al. . |
| 5,365,280 | 11/1994 | De Haan et al. . |
| 5,398,071 | 3/1995 | Gove et al. . |
| 5,404,171 | 4/1995 | Golstien et al. . |
| 5,426,464 | 6/1995 | Casavant et al. . |
| 5,430,489 * | 7/1995 | Richards et al. ............... 348/448 |
| 5,465,119 * | 11/1995 | Demos ........................... 348/447 |
| 5,517,247 * | 5/1996 | Correa ........................... 348/448 |
| 5,594,552 * | 1/1997 | Fujinami et al. ............... 386/131 |
| 5,621,470 * | 4/1997 | Sid-Ahmed ..................... 348/448 |
| 5,703,654 * | 12/1997 | Izuka ............................. 348/446 |
| 5,706,451 * | 1/1998 | Lightbody et al. ............. 395/327 |
| 5,754,248 * | 5/1998 | Faroudja ........................ 348/474 |
| 5,844,619 * | 12/1998 | Songer ........................... 348/447 |
| 5,874,937 * | 2/1999 | Kesatoshi ...................... 345/132 |
| 5,988,863 * | 11/1999 | Demos ........................... 708/203 |
| 6,111,610 * | 8/2000 | Faroudja ........................ 348/441 |
| 6,115,014 * | 9/2000 | Aoki et al. ..................... 345/88 |

OTHER PUBLICATIONS

"The Design Challenges of Full–Motion Video for PC–Compatible Computer Systems" David Hodgson; *SMPTE Journal*, Mar. 1993 pp. 207–216.

*BtV MediaStream Family Product Guide and Overview;* Brooktree Apr. 14, 1995.

"Video Stream Decoders"; Product Descriptions, Brooktree Jan. 1996.

"Here Comes Digital MMDS" by Richard Doherty; *Electronics Engineering Times* May 13, 1996; p. 130.

"The Elusive it" by Richard Doherty; *Electronic Engineering Times,* Jun. 10, 1996 p. 78.

"The Forces Behind Convergence" by Bill Howard; *PC Magazine,* Jun. 11, 1996 p. 93.

"Core Dynamics DynaMax HI–REZ plus" ISR: http//core–dynamics.com/w/c/maxtv.html on Jul. 18, 1996 at 11:55 am.

"The Big–Tube PCTV" PC Magazine Trends On–Line; ISR: http//www.pcmag.com/news/trends/t960528b.htm on Jul. 18, 1996 at 12:14 am.

WorldVision 2900C The Platform for Presentations & Teleconferencing; NET TV WorldVision Your Window to the World, ISR: http//www.net–tv.net/press/corpte.htp on Jul. 18, 1996 at 12:16 PM.

Snell & Wilcox Broadcast Products <<<Section 3>>>; ISR: http//www.hao.com/snell.htp on Jul. 18, 1996 at 11:29 AM.

* cited by examiner

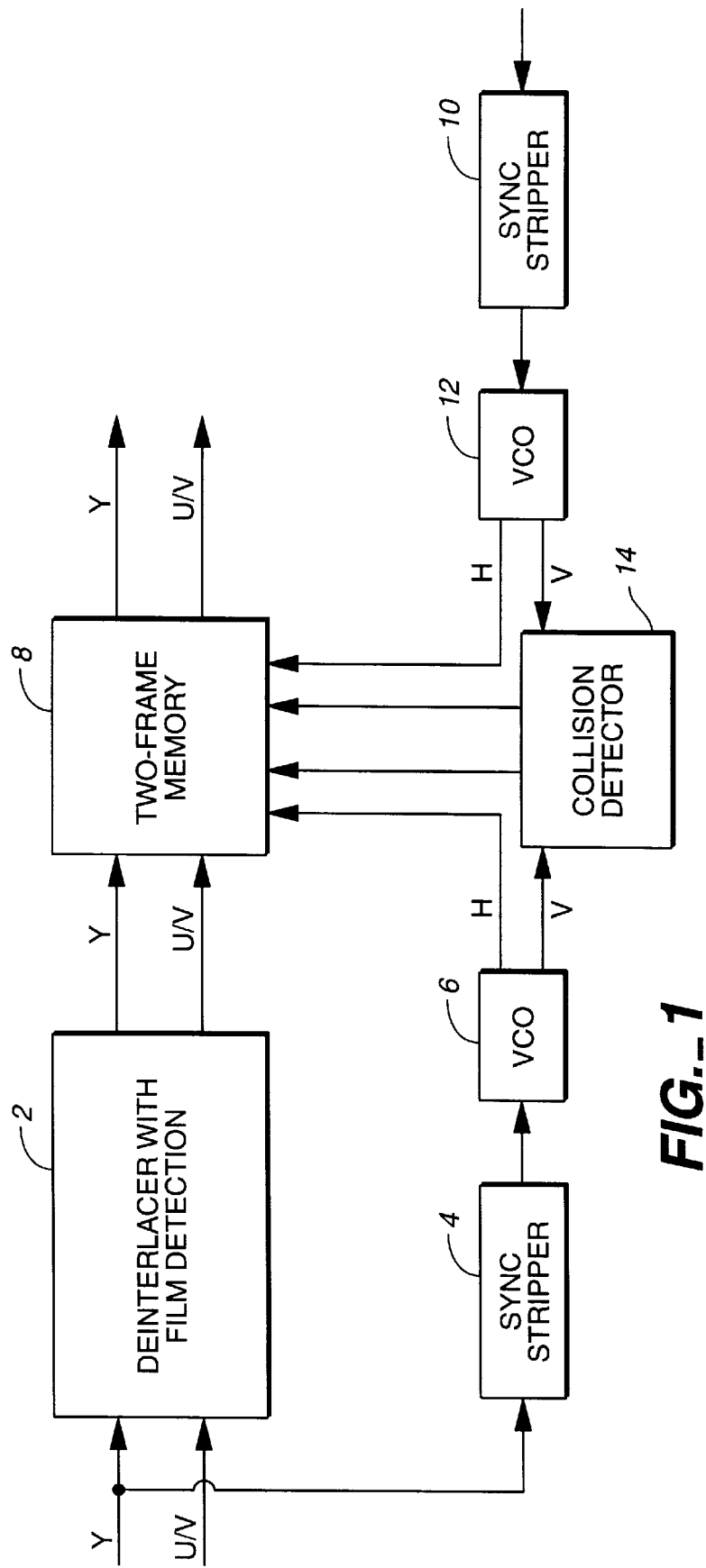
FIG._1

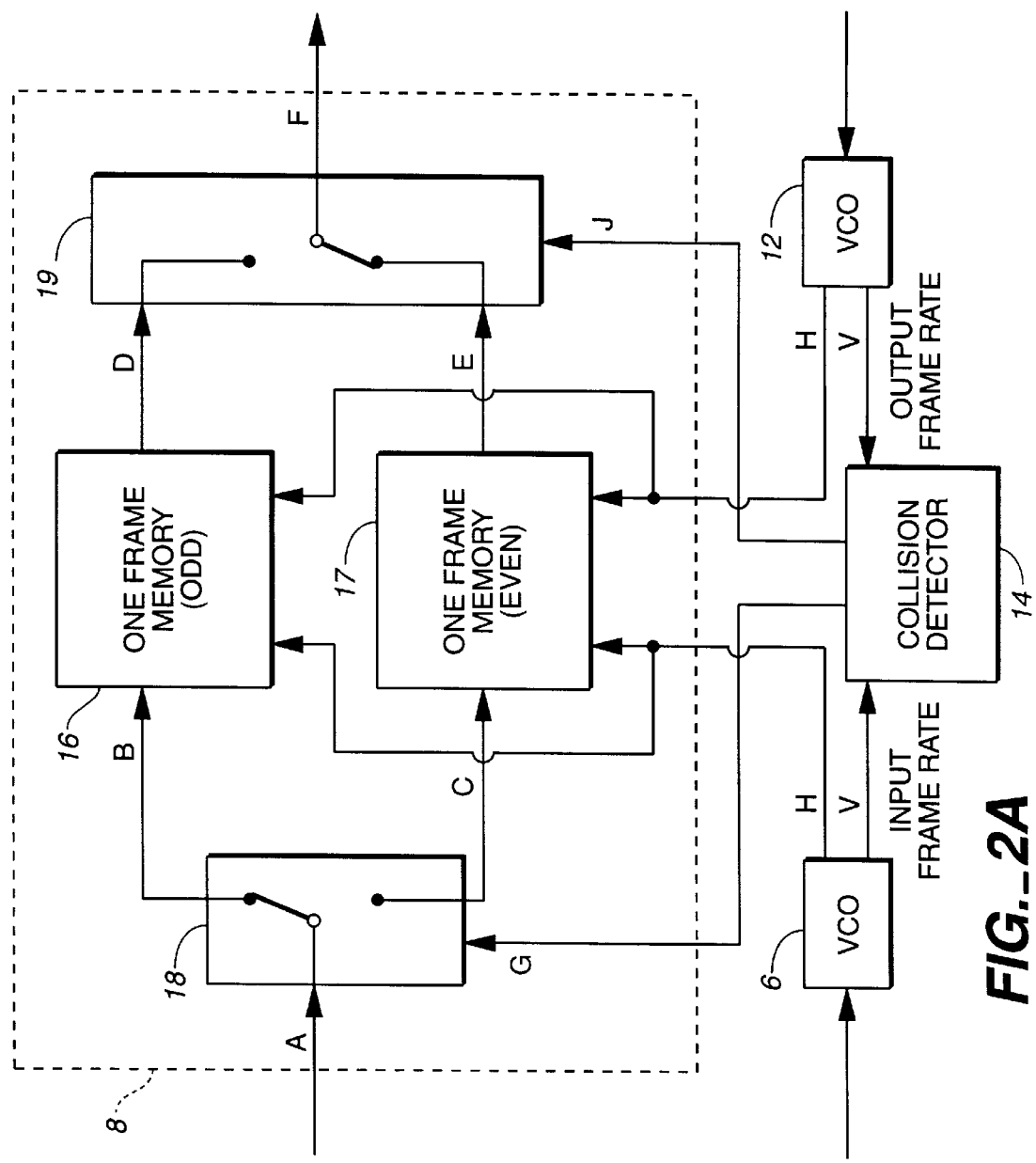
FIG._2A

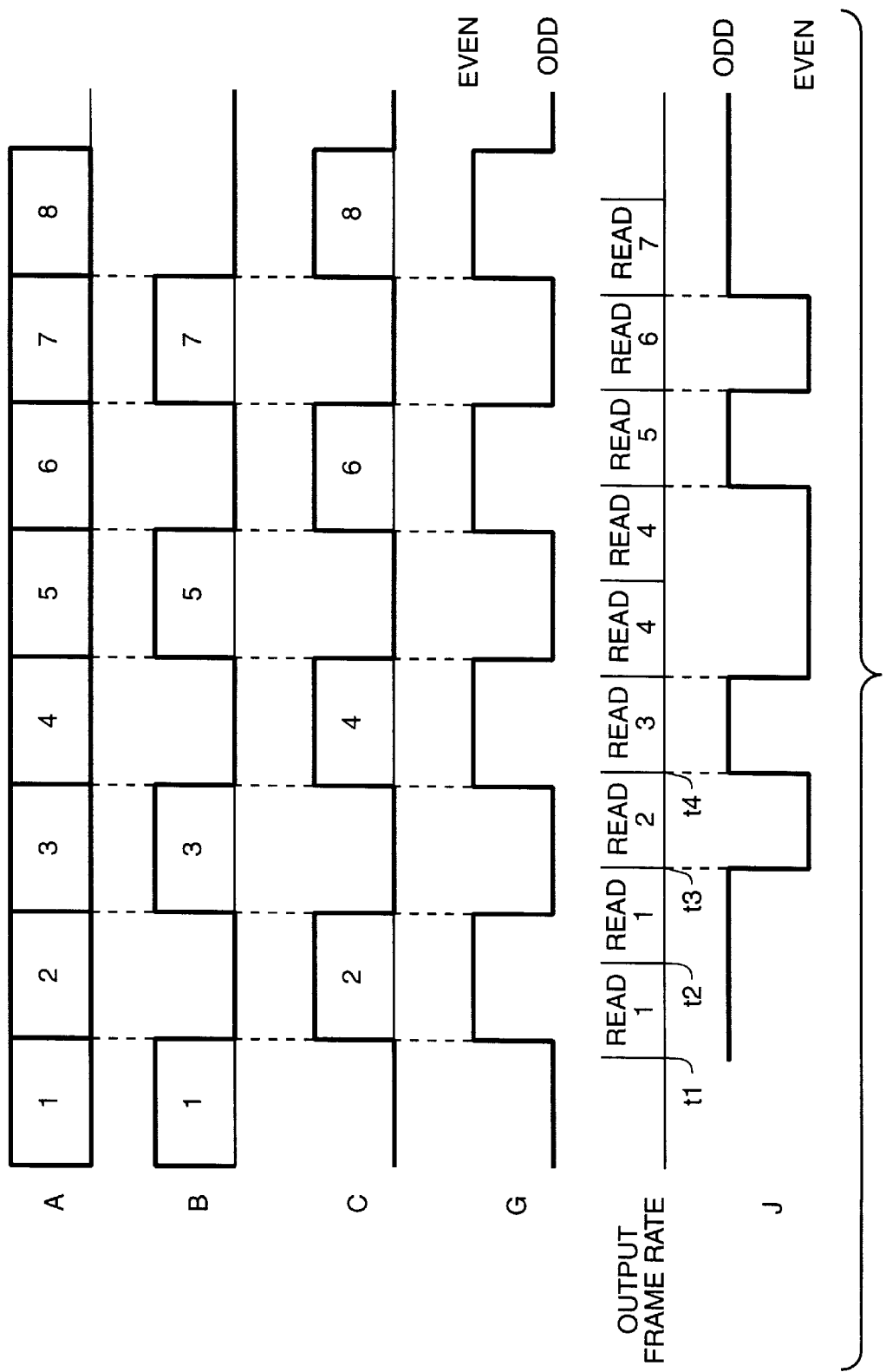
FIG._2B

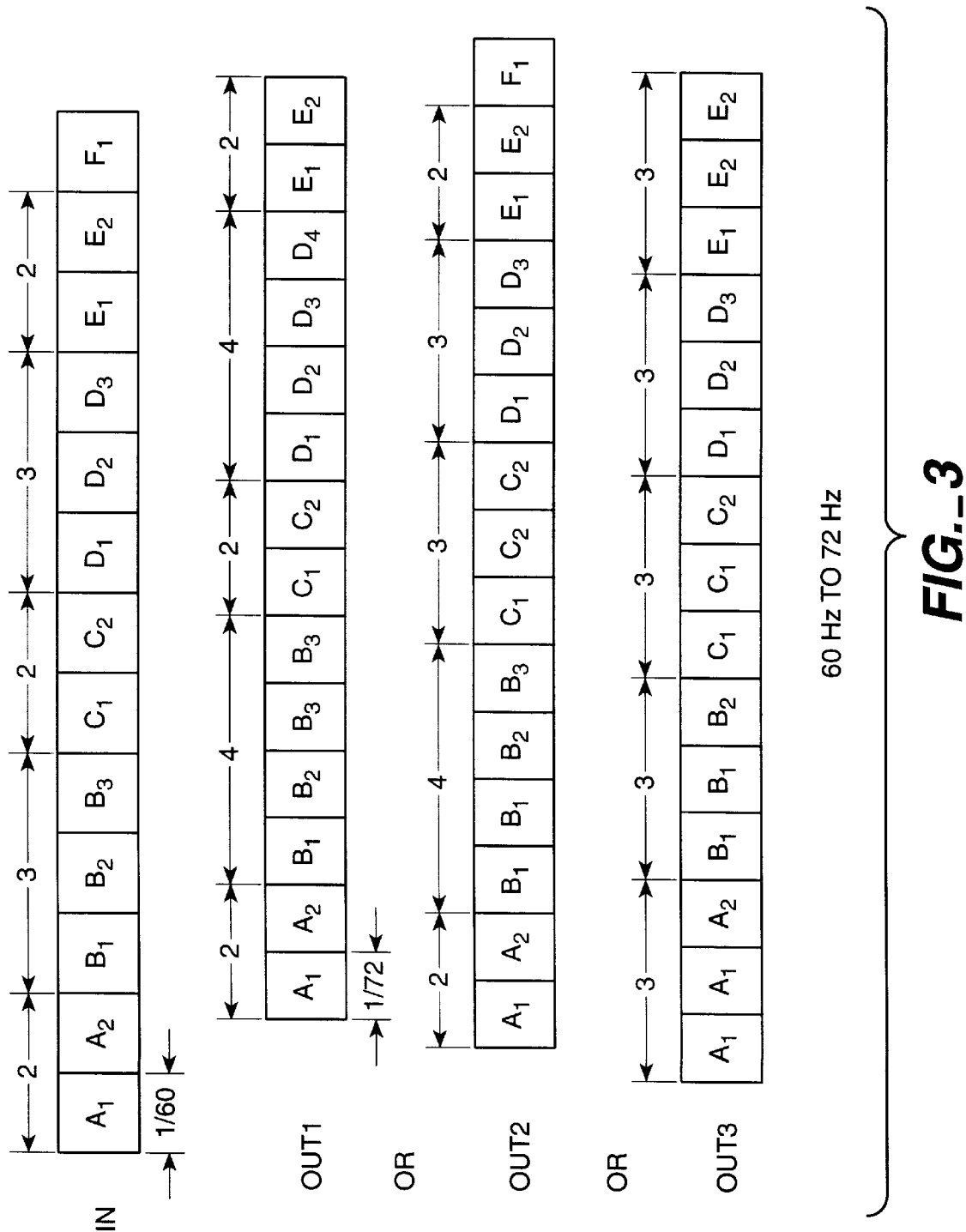

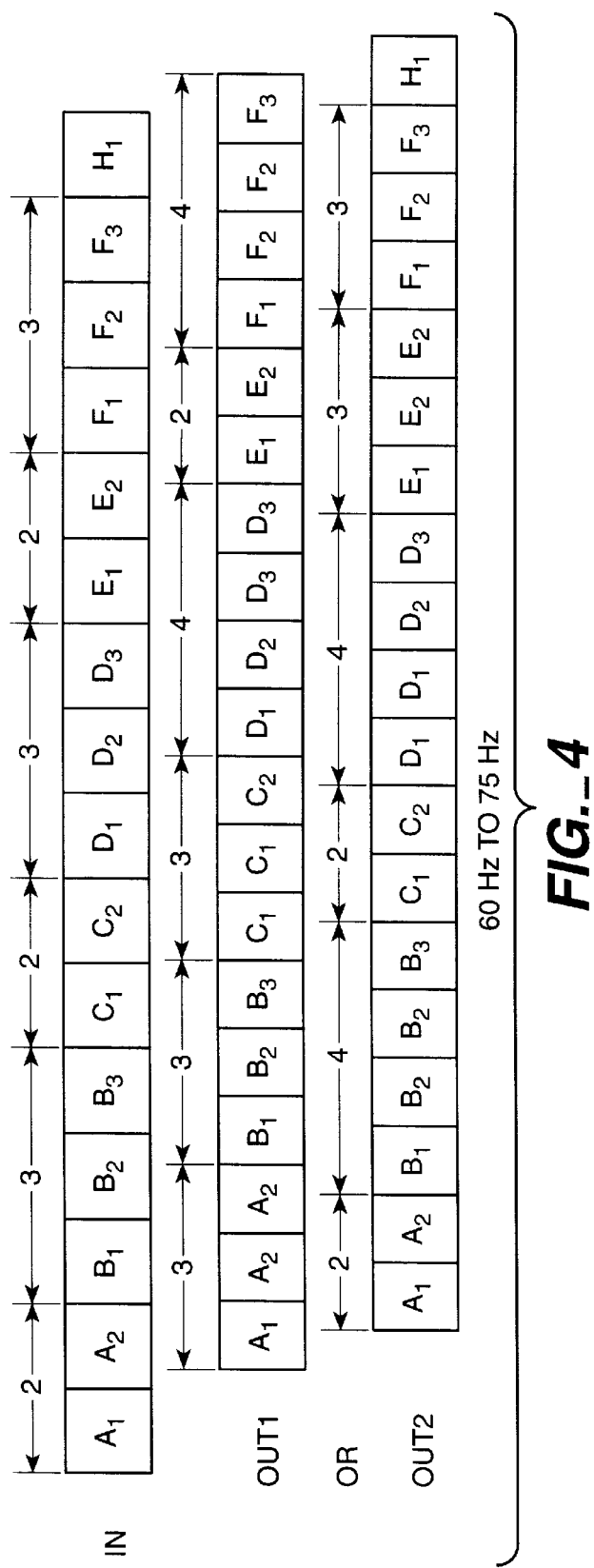
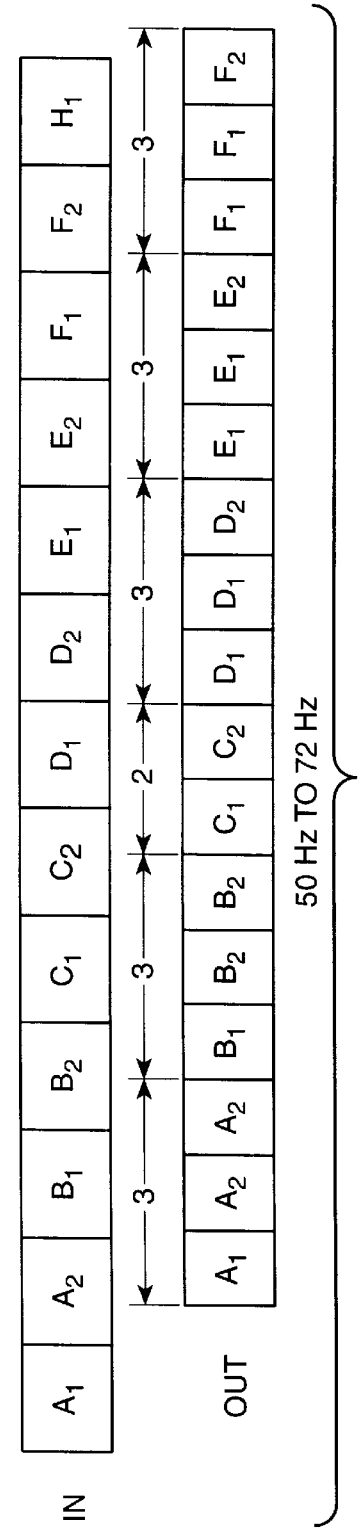
FIG._4
FIG._6

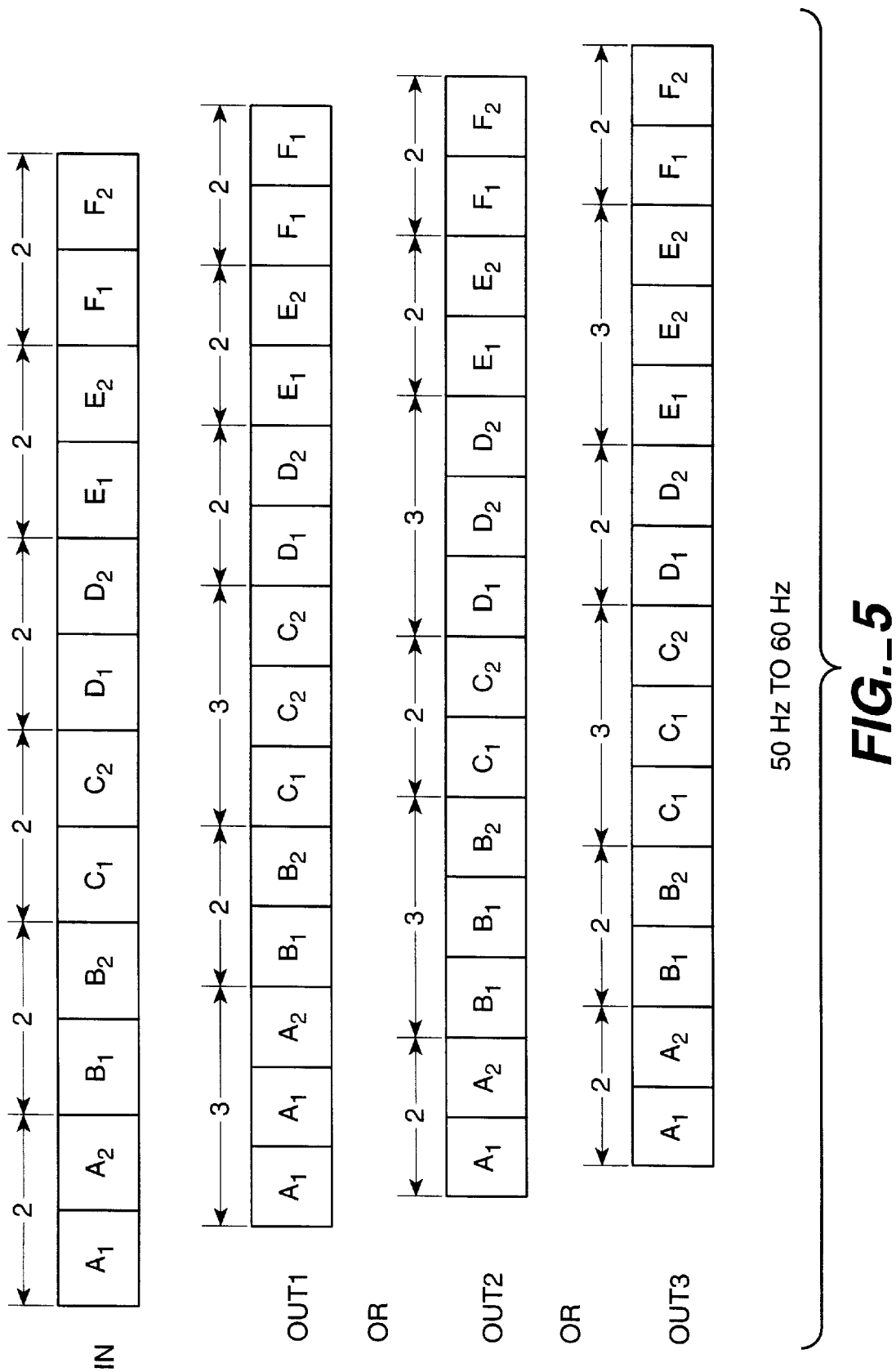
FIG._5

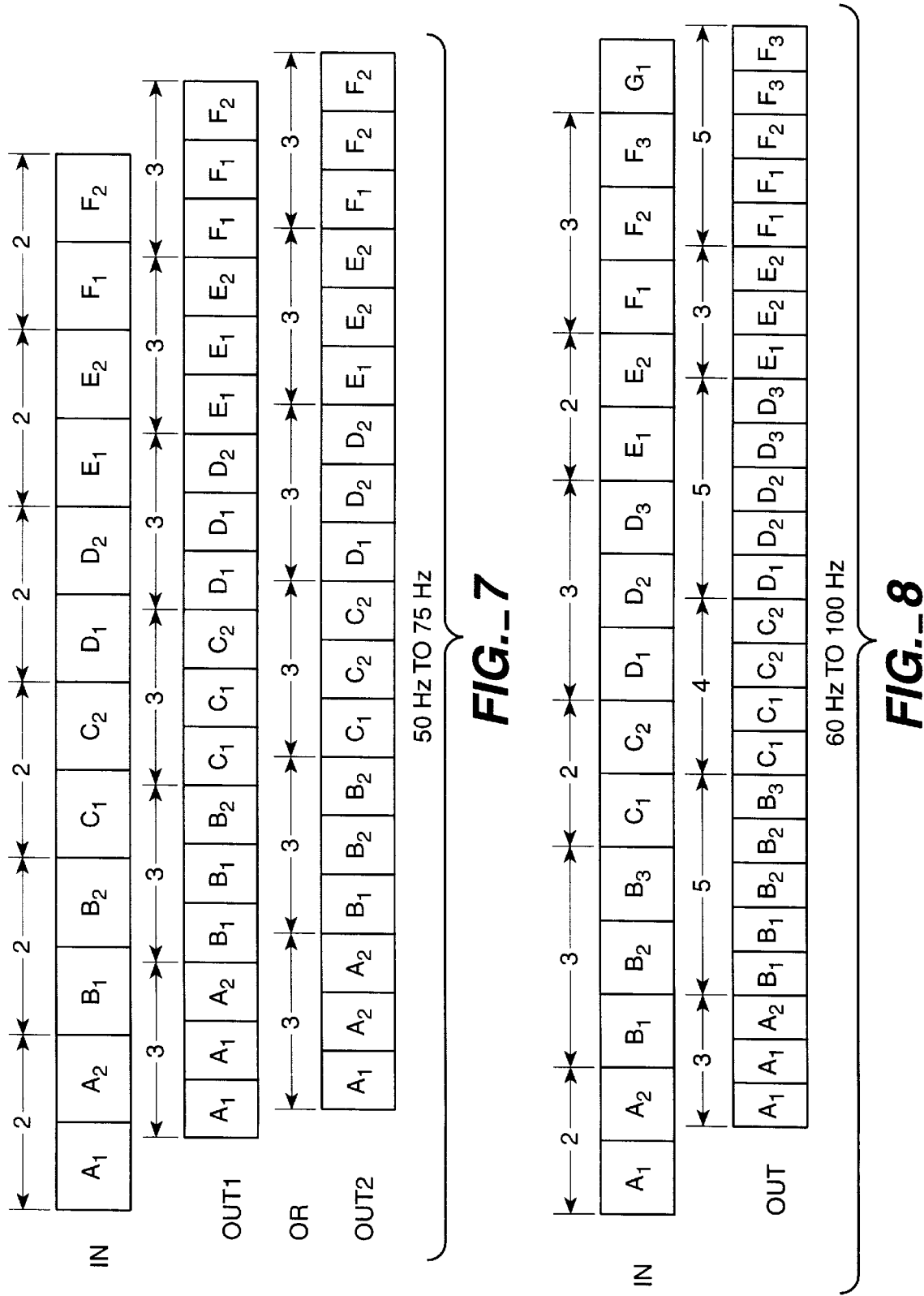

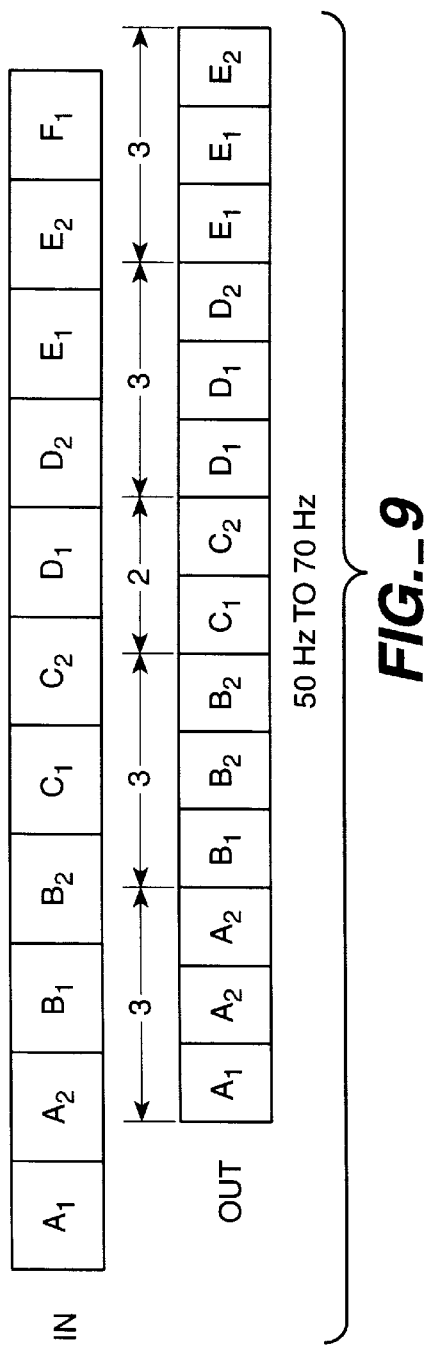
FIG._9
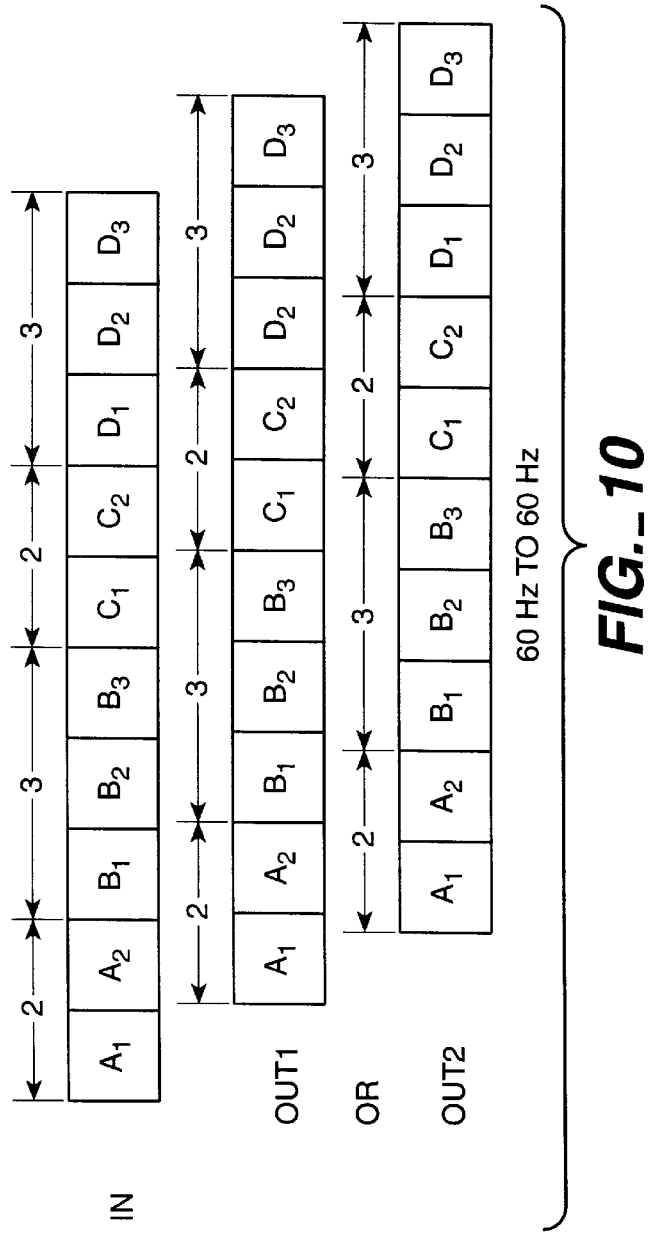
FIG._10

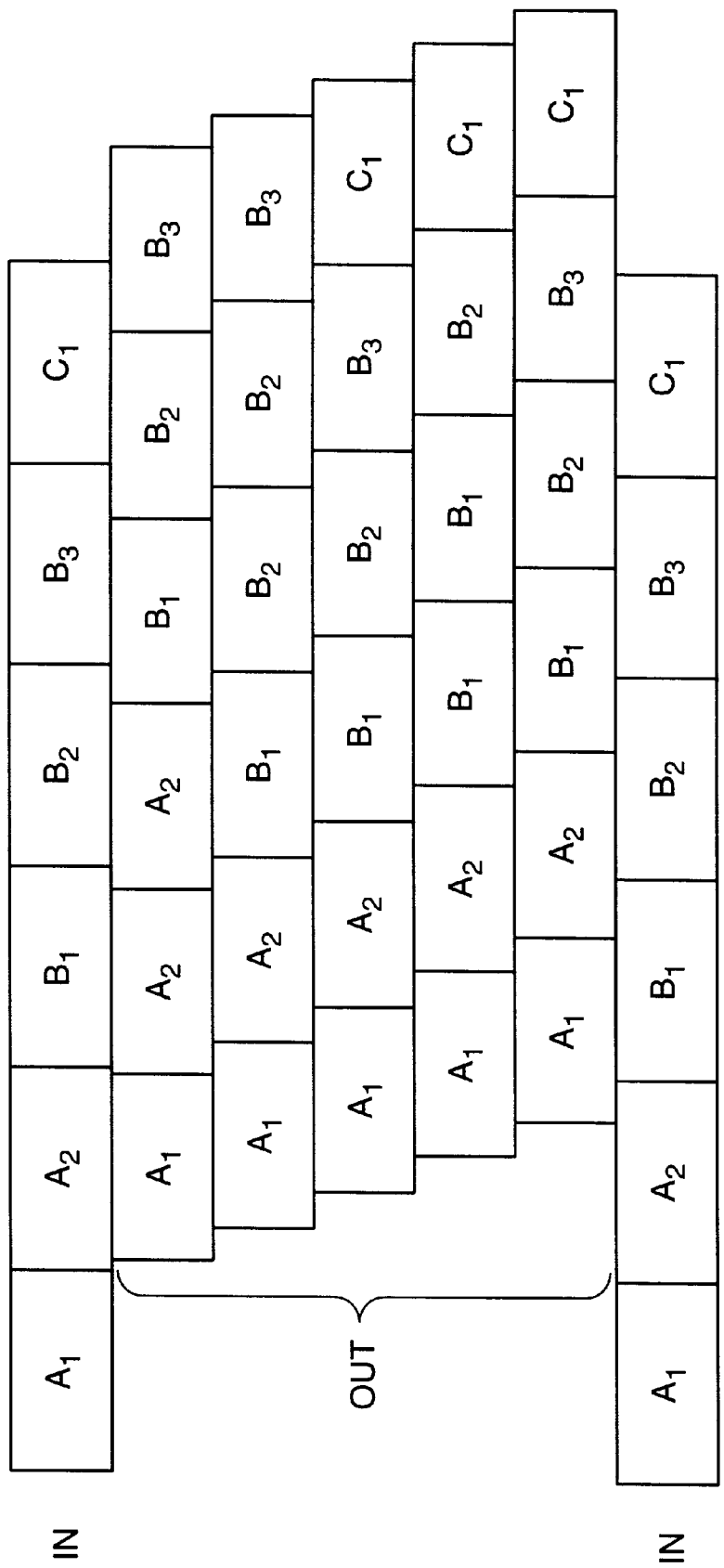
FIG._11
60 Hz TO 66 Hz

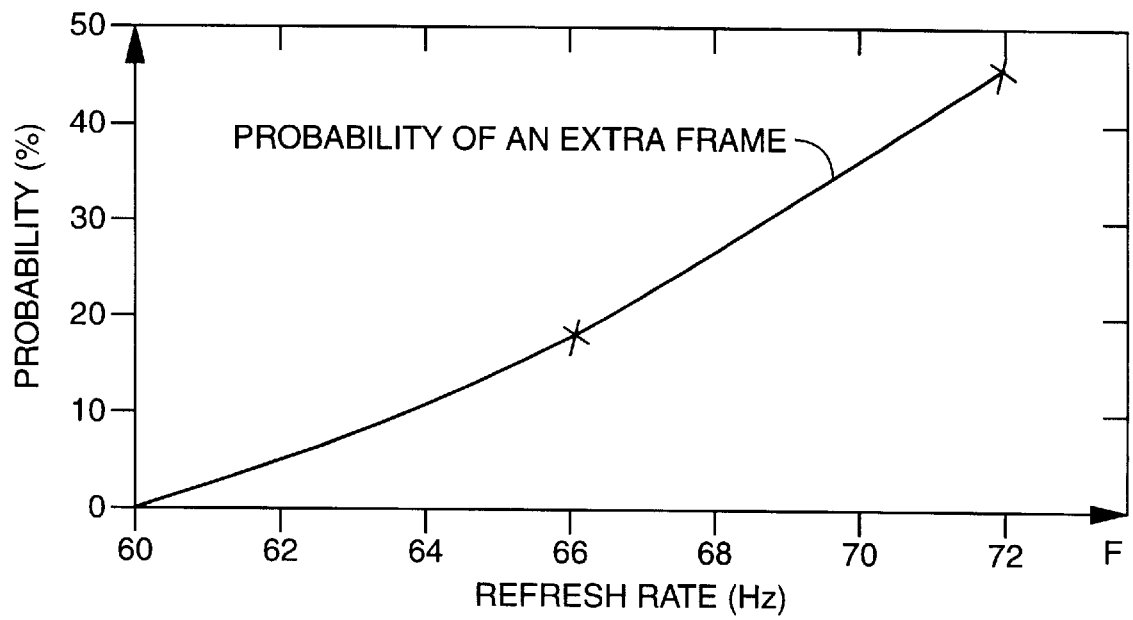
FIG._12
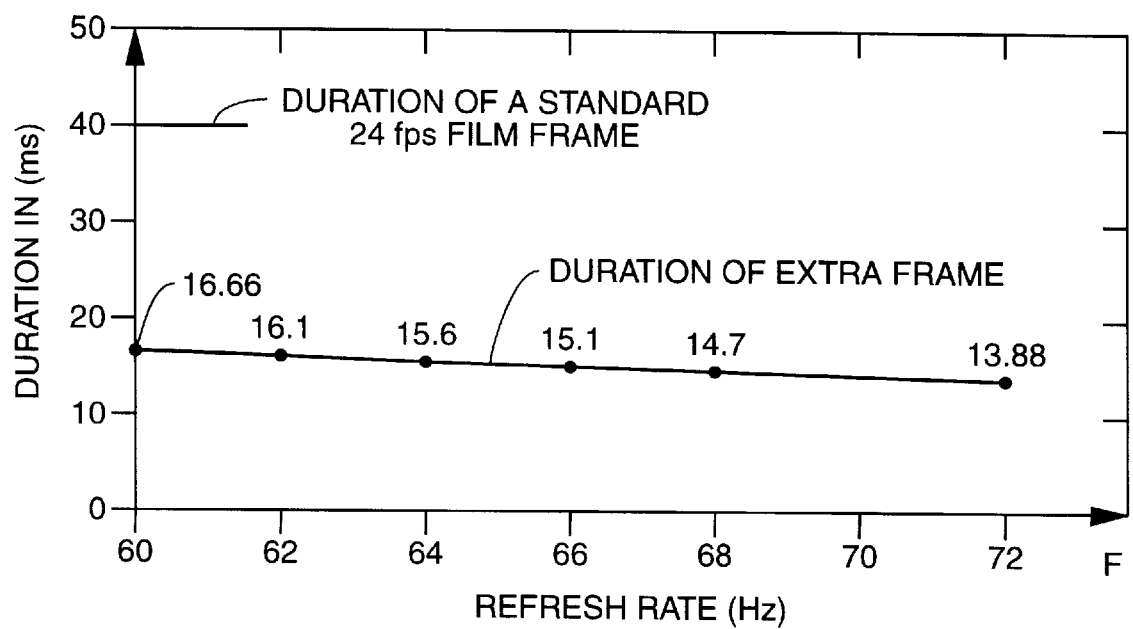
FIG._13

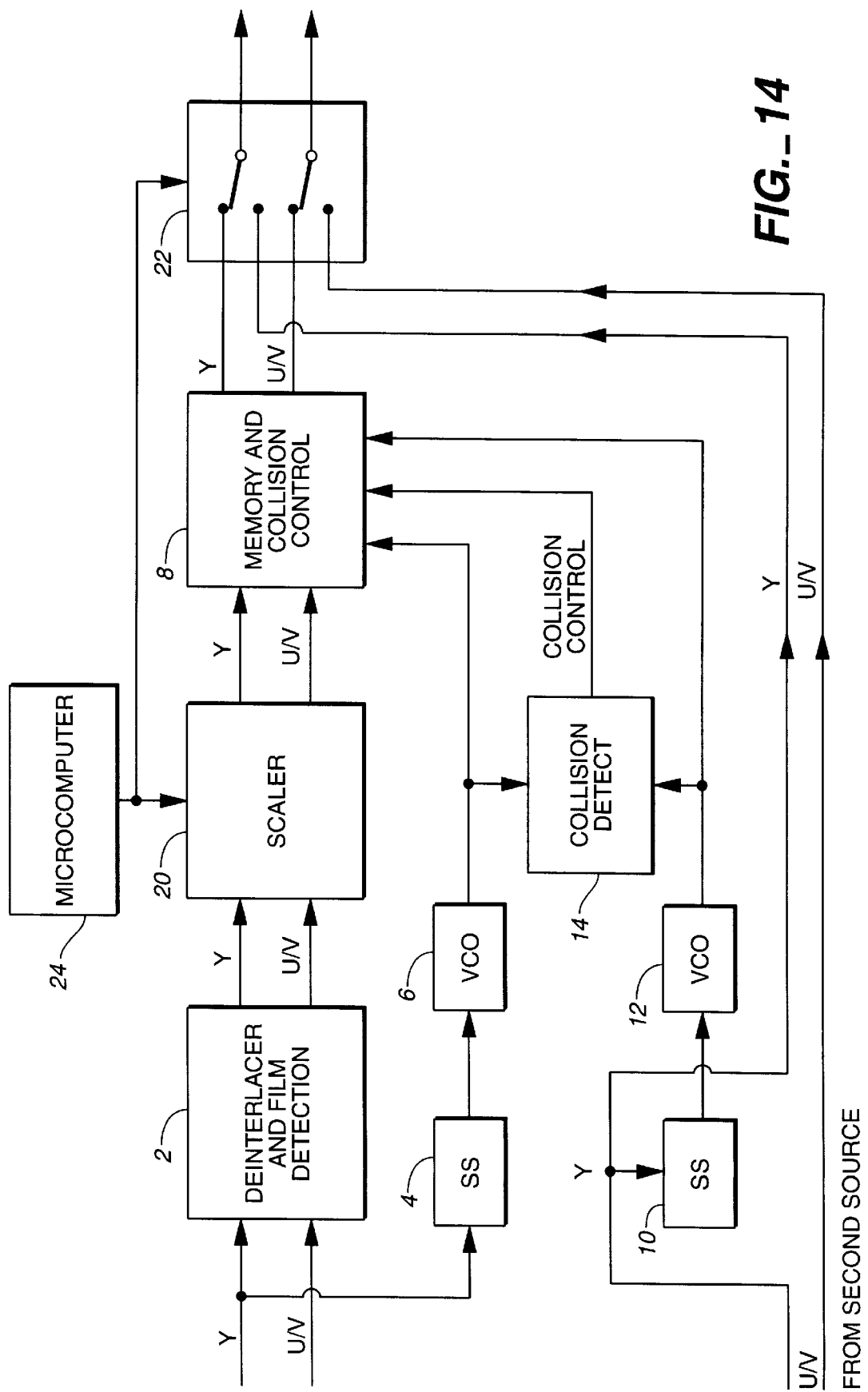
FIG._14

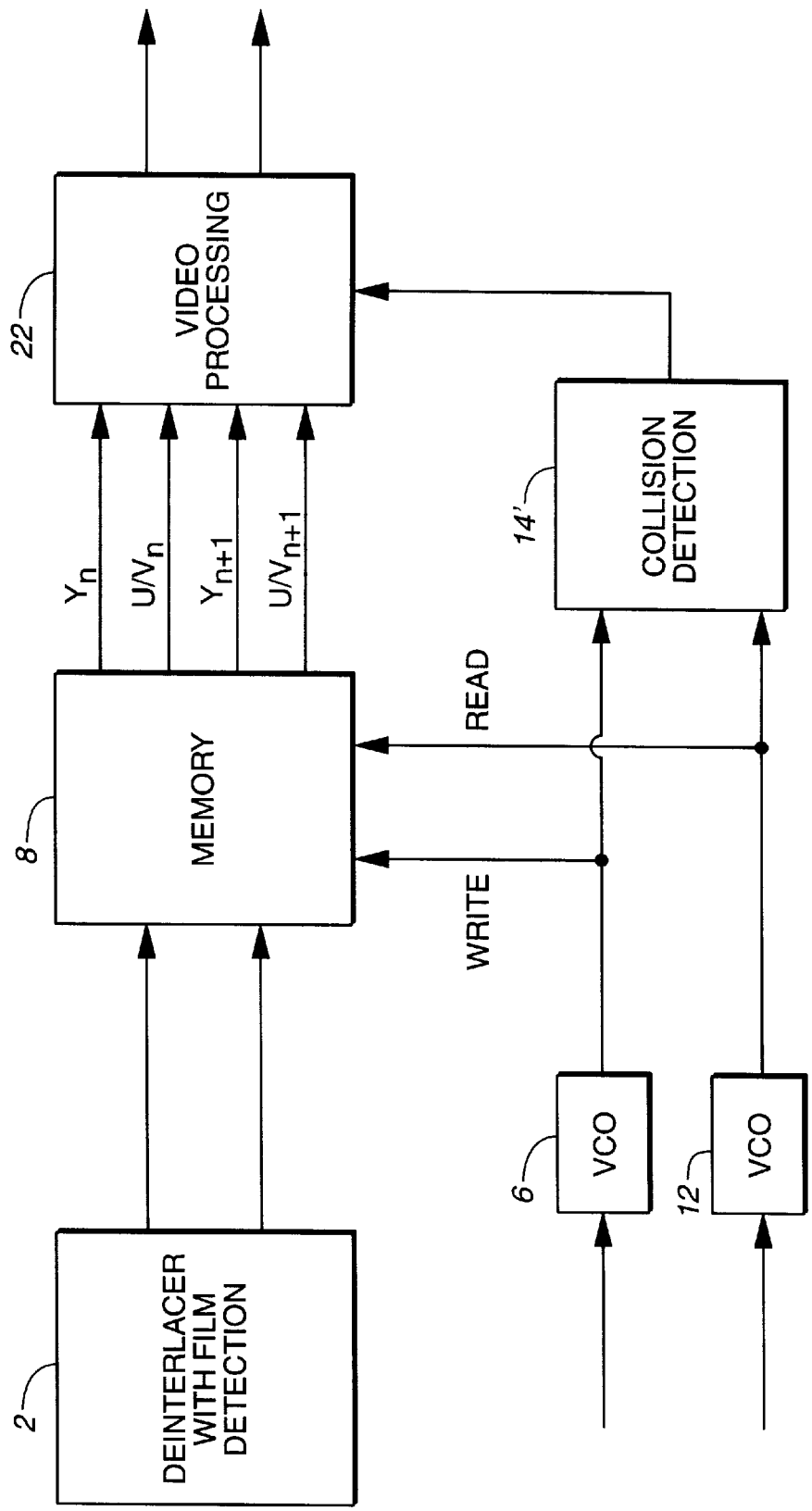
FIG._15

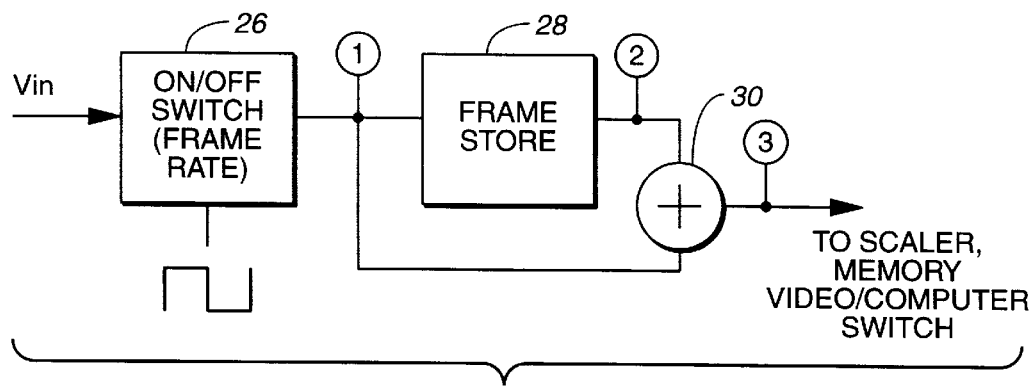
FIG._16
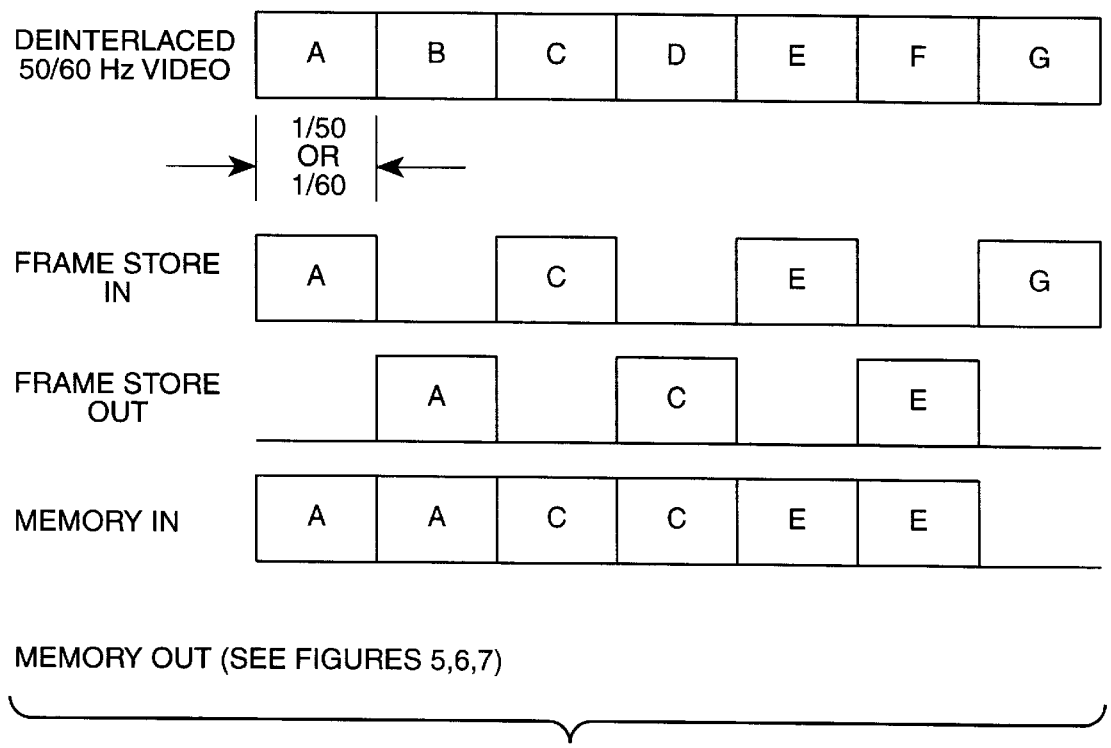
FIG._17

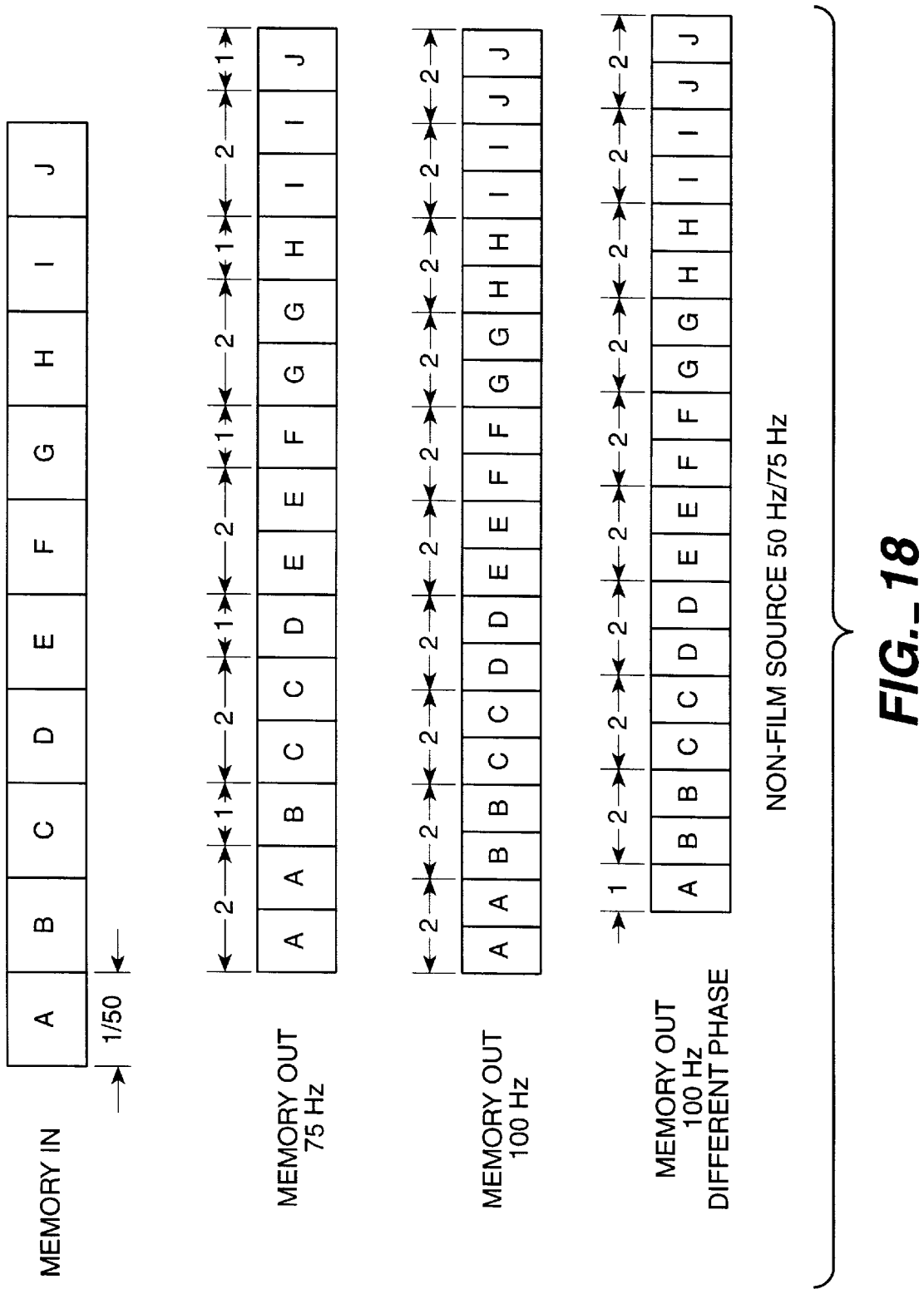
FIG._18

DISPLAYING VIDEO ON HIGH-RESOLUTION COMPUTER-TYPE MONITORS SUBSTANTIALLY WITHOUT MOTION DISCONTINUITIES

FIELD OF THE INVENTION

The present invention relates to television signal processing. More particularly, the present invention relates to improved signal processing apparatus and methods for displaying video signals on high-resolution computer-type monitors substantially without motion discontinuities. The invention facilitates "mixed-signal" or "multimedia" displays of television and computer graphics signals on the same high-resolution computer-type monitor.

DESCRIPTION OF RELATED ART

In recent years the "convergence" of television and computers has received considerable attention in both the industry and the consumer media. A problem in "marrying" computers and television sets is that signal formats for computer graphics and television are incompatible.

Computer monitors typically provide a much higher resolution than do conventional television sets; they are usually progressively scanned with a relatively high frame rate (refresh" rate in computer jargon), typically at 72 Hz or more, in order to avoid flickering and eye strain. Most computer-type monitors are capable of handling a wide range of refresh rates from 60 Hz upward.

Television signals, on the other hand, are interlaced, having pairs of fields at a nominal 50 Hz rate (PAL) or a nominal 60 Hz rate (NTSC), resulting in frame rates of 25 Hz and 30 Hz, respectively.

In addition, many computer monitors are capable of displaying substantially more horizontal lines than are present in conventional interlaced television signals.

In order to overcome such incompatibilities, various techniques are known, for example, to convert progressively-scanned computer graphics VGA and SVGA signals to interlaced NTSC and PAL television signal form for display on a conventional television set. Techniques for converting interlaced NTSC and PAL television signals to progressively-scanned signals for display on computer-type monitors are also known.

The present invention is concerned with improvements in converting interlaced television signals to progressively-scanned signals for display on computer-type monitors. A problem with prior art conversion techniques has been that, in the absence of special processing, video signals displayed on a computer-type monitor have psychovisually disturbing motion discontinuities due to the differences in frame rates. For example, when a television signal is displayed on a computer-type monitor, a pendulum may appear to stop briefly or to jump during its swing. Many conversion schemes simply accept such results. Other converters employ frame averaging and/or fire interpolation techniques, adding to the complexity and cost of the converter. Simple, inexpensive techniques, such as averaging two frames, degrade picture resolution and produce double images that may be visible. Techniques causing fewer disturbing processing artifacts, such as frame interpolation, are complex and expensive.

Thus, there is an unsatisfied need for a simple, inexpensive technique, substantially free of motion discontinuities, for converting interlaced television signals to progressively-scanned signals for display on computer-type monitors.

SUMMARY OF THE INVENTION

In accordance with the present invention, a television signal is converted to a form suitable for display on a progressively-scanned variable-frame-rate high-resolution monitor of the type typically associated with a computer. A succession of progressively-scanned video frames are generated, wherein each frame is repeated at least twice in succession (i.e., the duplicated flames are identical to one another). A video frame memory stores at least two progressively-scanned video frames. Progressively-scanned video frames are written into the video frame memory at a rate derived from the timing of the progressively-scanned video frames and reading out of the video frame memory at a rate derived from the timing of the display monitor's frame rate.

A succession of progressively-scanned video flames in which each frame is repeated at least twice in succession is preferably obtained from a properly deinterlaced conventional 50 Hz or 60 Hz interlaced television signal whose source is a motion picture film (typically having a 24, 25 or 30 frames per second frame rate—25 fps for 50 Hz television and 24 or 30 fps for 60 Hz television).

In the case of a film source which has been converted to an interlaced television signal (or other progressively-scanned source which has been converted to an interlace television signal, such as a computer animated video, all of which will be referred to herein, for convenience, as a "film source"), the television signal is deinterlaced by merging opposite polarity pairs of interlaced fields derived from the same progressively scanned source frame. Each such merged pair, constituting a new deinterlaced frame, is repeated at least twice (a 3-2 pattern for 60 Hz NTSC and a 2-2 pattern for 50 Hz PAL) so that the deinterlaced signal has a frame rate the same as the original interlaced television field rate and each deinterlaced frame preferably has more horizontal scan lines than in each original interlaced television field. Field merging deinterlacers typically produce progressively-scanned frames in which there are substantially twice the number of horizontal scan lines as in each original interlaced television field. However, the number of horizontal scan lines may be increased even further, if desired. Suitable deinterlacers are known in the prior art, as described below.

The frame rate of the deinterlaced frame repeating video signal is converted to the computer-type monitor's frame rate by skipping (skipping occurs only when the monitor frame rate is less than the frame rate of the deinterlaced video) or duplicating a video frame from time to time, such that ordinarily at least two but not more than five consecutive identical deinterlaced video frames are displayed corresponding to each film source frame. The invention is primarily concerned with monitor frame rates greater than the frame rate of the deinterlaced video.

There is no requirement to synchronize either the computer-type monitor's frame rate or line rate to the frame rate or line rate, respectively, of the interlaced or deinterlaced video signals.

Frame rate conversion of the deinterlaced television signal may be accomplished by means of a two frame buffer memory in which the read-in is at the deinterlaced television signal rate and the read-out is at the frame rate of the computer-type monitor. Frames are skipped or duplicated in order to prevent memory underflow or overflow. The resulting frame repetition patterns have been found to produce motion-discontinuity-free video displays at refresh rates from 50 Hz to 100 Hz, for 50 Hz inputs, and from 60 Hz to 120 hz, for 60 Hz inputs, relatively simply and inexpensively.

In an alternative embodiment, interlaced video signals derived from "non-film" video sources (sources other than a "film source, as defined above, such as a video camera) preferably are converted to a film-source-like video signal. Deinterlaced video having a frame rate the same as the field rate of the interlaced television signal is derived using any conventional technique (e.g., line duplication, line interpolation, etc.), which increases (typically doubles) the number of lines originally in each interlaced field. An artificial film source sequence is established by repeating successive frames of line-increased progressively-scanned video so that at least 2 successive frames are identical. Although a 3-2 pattern for a 60 Hz source may be created, a 2-2 pattern for both 50 Hz and 60 Hz sources is preferred. In the case of a 2-2 pattern, every other progressively scanned frame is discarded and replaced by the repeated frame. The pseudo-film-source-like video is then applied to the double frame buffer as in the case of a film-source video signal. The resulting computer-type monitor displays are also substantially free of motion discontinuities but with the introduction of slight motion blurring (substantially as would be present if the source had actually been a motion picture film).

BRIEF DESCRIPTION OF THE DRAWINGS

FIG. 1 is a functional block diagram of a basic embodiment of the present invention.

FIG. 2A is a functional block diagram showing the collision control arrangement in more detail.

FIG. 2B is an idealized timing information chart useful in understanding the operation of the collision control arrangement of FIG. 2A.

FIGS. 3–11 are idealized timing charts useful in demonstrating the operation of the present invention.

FIG. 12 is an idealized graph showing the probability of an extra video frame output as a function of output frequency for a 60 Hz input signal.

FIG. 13 is an idealized graph showing the duration of an extra video frame as a function of output frequency for a 60 Hz input signal.

FIG. 14 is a functional block diagram of a preferred embodiment of the present invention.

FIG. 15 is a functional block diagram showing optional additional video processing for processing television signals not derived from a motion picture source.

FIG. 16 is a functional block diagram showing an arrangement for creating an artificial film sequence FIG. 17 is an idealized timing diagram useful in understanding the operation of the arrangement of FIG. 16.

FIG. 18 is an idealized timing diagram showing the cases of 75 and 100 Hz outputs from a 50 Hz non-film source.

DESCRIPTION OF THE PREFERRED EMBODIMENTS

A functional block diagram of a basic embodiment of the present invention is shown in FIG. 1. A video signal deinterlacer 2, constituting means for generating a succession of progressively-scanned video frames wherein each frame is repeated at least twice in succession, receives at its input the luminance (Y) and chrominance (U/V) components of an interlaced nominally 50 Hz field-rate television signal (such as a PAL, SECAM, 50 Hz NTSC, 50 Hz HDTV or 50 Hz monochrome television signal) or an interlaced nominally 60 Hz field-rate television signal (such as an NTSC, 60 Hz HDTV or 60 Hz monochrome television signal). The outputs of deinterlacer 2 are luminance and chrominance components progressively scanned, having the same frame rate as the interlaced input signal's field rate. Thus, a nominally 60 Hz field-rate interlaced input signal results in a nominally 60 Hz frame-rate progressively scanned output signal.

The input field rates are "nominally" 50 Hz or 60 Hz in that the input signal source may be a relatively unstable consumer-quality videocassette player (such as a VHS format consumer player or recorder/player). Moreover, even a stable broadcast "60 Hz" NTSC signal has an actual field rate of 59.94 Hz. Thus, the precise field rate of the input signal is not critical and may vary over a range at least as great as that produced by consumer video sources. The component video input signal to deinterlacer 2 may be provided by a conventional decoder (not shown) receiving a composite television signal.

The input luminance signal (Y) is also applied to a conventional synchronization pulse stripper (sync stripper) 4 and voltage controlled oscillator 6 in order to generate an input clock signal related to the time base of the input video signal. The use of the input clock signal is described further below.

Deinterlacer 2 is the type of interlacer which performs deinterlacing (i.e., interlaced-to-progressive-scan conversion) by merging pairs of interlaced fields derived from the same motion picture film frame when the original video source is a film source. In order to do so, the deinterlacer may include a film-source detector or a film-source identification signal may be transmitted along with the television signal. Such deinterlacers, per se, are known in the prior art. A progressively scanned output frame is produced for every interlaced input field. Each progressively scanned output frame, being the merging of two fields, typically has at least twice the number of horizontal lines as each input field. Such a deinterlacer is often referred to in the art as a "line doubler." The number of lines may be increased further to achieve line tripling or line quadrupling, if desired.

A 24 frame/second motion picture film is applied to and synchronized with 60 Hz NTSC video by using a 3-2 film pulldown ratio such that three video fields come from one film frame and the subsequent two video fields come from the next film frame (e.g., AABBBCCDDDEE, etc., where "A," "B," etc. are successive film frames). It is known to detect that a nominally 60 Hz NTSC television signal has a film source. For example, in accordance with U.S. Pat. No. 4,876,976, video fields of the same parity in adjacent video frames are compared. When motion is present, a distinctive repeating pattern is obtained only if the video source is film (i.e., 1101111011, etc., where "1" indicates motion and "0" indicates no motion). Related techniques and other techniques for detecting a film source in video signals are disclosed in U.S. Pat. Nos. 4,876,596; 4,967,271; 4,982,280; 4,989,090; 4,998,167; 5,255,091; 5,259,451; 5,291,280; 5,365,280; 5,398,071; and Published International Application WO 95/24100. Each of the United States Patents identified in this paragraph is hereby incorporated by reference in its entirety.

For the case of a nominally 60 Hz interlaced scanned input signal, deinterlacer 2 produces progressively-scanned video having a frame rate the same as the nominally 60 Hz interlaced field rate. In addition, the frames will have the same 3-2 pattern. That is, three identical progressively-scanned frames (corresponding to one original film frame) followed by two identical progressively-scanned frames (corresponding to the next original film frame), etc. Occasional disruptions in the 3-2 pattern are acceptable.

In 50 Hz television systems, the video field rate (25 Hz) is the same as the motion picture film frame rate of 25 frames/second, which is speeded up from 24 frames/second in order to achieve synchronism with the television rate. This avoids any requirement similar to the 3-2 pulldown scheme which is used to synchronize 24 frame/second films with the nominally 60 Hz NTSC television signal. Because the 2-1 interlaced frame rate for 50 Hz television systems is 50 Hz, the film frames are repeated twice for each video frame, once for each interlaced video field. Thus, video field "1" corresponds to film frame "A," video field "2" also corresponds to film frame "A," video field "3" corresponds to film frame "B," etc.

By detecting that a 50 Hz television signal source is a motion picture film it is then known that the two fields of each television frame are identical in the temporal domain, as they are generated from a single film frame. Consequently, the interlaced 50 Hz television signal may be treated as a progressively-scanned signal by merging or reassembling the interlaced scan lines of each television frame.

In 50 Hz television systems, because there is no NTSC-type 3-2 pull down ratio, film sequences cannot be detected with frame motion detection circuitry. Examining video frame motion per se in a 50 Hz system yields no useful information as to whether a video sequence is a film source. Instead, in order to determine if the source is a motion picture film, it is necessary to compare adjacent video fields. In other words, in order to detect the AABBCC, etc. pattern of film frames in the 50 Hz television signal stream, it is necessary to examine adjacent video fields for motion because only adjacent video fields will always carry the same video frame and will thus never have any motion.

The detection of motion in adjacent video fields of an interlaced television requires the separation of true motion from the presence of motionless vertical transitions between the fields. In an interlaced television system, in the vicinity of vertical transitions (e.g., a horizontal black/white edge, such that the top of the picture is black and the bottom is white) there will always be spatial differences between the fields due to the offset of the horizontal scan lines in adjacent interlaced fields. This difference must be distinguished from motion in order to successfully identify adjacent video fields carrying the same motion picture film frame. Arrangements for separating true motion from the motionless vertical transitions between the fields in order to detect a motion picture film pattern in a PAL video signal are known. See, for example, Published International Patent Application WO 94/30006.

For the case of a nominally 50 Hz interlaced scanned input signal, deinterlacer 2 produces progressively-scanned video having a frame rate the same as the nominally 50 Hz interlaced field rate. In addition, the frames will have the same 2-2 pattern. That is, two identical progressively-scanned frames (corresponding to one original film frame) followed by two identical progressively-scanned frames (corresponding to the next original film frame), etc. Occasional disruptions in the 2-2 pattern are acceptable.

Deinterlacer 2 thus employs separate processing techniques depending on whether the input signal is nominally 50 Hz or nominally 60 Hz. A suitable commercially available deinterlacer capable of handling PAL and NTSC inputs and providing the proper progressively-scanned output is the Model LD100 Line Doubler, marketed by Faroudja Laboratories, Inc. of Sunnyvale, Calif.

An essential requirement of the invention is that a progressively-scanned signal is provided in which each frame is repeated at least twice (although occasional disruptions are acceptable). Such a signal may be provided not only by properly deinterlacing a film-source television signal but also by the direct output of a progressively-scanned source which has never been interlaced, as, for example, computer-generated animation which has not been converted to interlaced form.

One such alternative signal source possibility is a frame-doubled 30 Hz progressive-scan source. U.S. Pat. No. 4,982,280 discloses an arrangement for detecting a 30 Hz progressive-scan source, which may be a video camera or film, in a 60 Hz progressively-scanned non-interlaced television system. In the presence of motion from frame-to-frame within the 30 Hz progressively-scanned video image sequences, when the video sequences in adjacent video fields are compared a 010101, etc. pattern results, indicating a 30 Hz progressively-scanned source. Comparison of every second video field, to yield a 111111, etc., pattern, further confirms the 30 Hz progressive-scan source. In order to operate, the arrangement relies on the spatial coincidence of pixels in the successive identical pairs of fields of the progressive-scan television signal.

There are other sources of a progressively-scanned source which has never been interlaced. For example, there are new recording (such as digital videodiscs) or transmission schemes (such as digitally compressed video transmission using the MPEG process) which deliver a progressive-scan video sequence of 24 or 25 frames per second, mimicking, in the temporal domain, a motion picture film frame sequence. For these signals, every progressive-scan video frame is different from the prior one, even in the presence of motion. In the case of such a signal, the means for generating a succession of progressively-scanned video frames wherein each frame is repeated at least twice in succession is not implemented as a deinterlacer, but rather a processor for repeating each progressively-scanned input frame at least once (a 2-2 sequence or a 3-2 sequence).

The output of deinterlacer 2 or an alternative progressively-scanned video signal source having the required frame repetitions is applied to a two-frame ("double frame buffer") memory 8, constituting video frame memory means for storing at least two progressively-scanned video frames. Double frame buffers, per se, are well known in the art. See, for example, *Television Engineering Handbook*, Revised Edition, edited by K. Blair Benson, revised by Jerry Whitaker, McGraw-Hill, Inc., San Francisco, 1992 at page 19.6: "When there are two copies of the frame buffer, the computer can update one while the video circuit reads the other. When both finish access is switched and the video circuit reads what was just written while a new copy is formed." Double frame buffers are also known for use in avoiding "tearing" when converting deinterlaced 50 Hz and 60 Hz television signal to 70–80 Hz computer graphics display frame rates. See, for example, *Video Demystified*, by Keith Jack, Hightext Publications, Inc., Solana Beach, Calif., 1993 at page 14. Tearing occurs when a video picture is not entirely from a single video frame. Double buffering permits switching from one frame store to another only after the new frame store has been completely updated.

As is explained in further detail below, the present invention contemplates video frame output rates from memory 8 at rates preferably in the range of 50 Hz to 120 Hz (although as described below, rates just below and just above that range may provide acceptable, although less optimal, results).

The video input to memory 8 is written-in at a rate derived from the timebase of the input video signal by sync stripper (horizontal synchronization stripper) 4 and (voltage controlled oscillator) VCO 6 and is read out at a rate derived from the timebase of the output video reference by a second sync stripper 10 and a second VCO 12. The output video reference will usually be taken from the synchronization reference employed by the display monitor (e.g., from a computer or other scanning control device associated with a high-resolution graphics display monitor).

The input and output clock rates of the frame buffer memory 8 need not be synchronized, nor is there any requirement to lock the vertical or horizontal vertical or horizontal synchronization of the input television signal to that of the display (i.e., the input signal and the display signal need not be generator locked or "gen locked") even if both are nominally at the same frequency (such as 60 Hz). The write-in and readout rates are usually different, sometimes by a substantial amount (e.g. 50 Hz input, 100 Hz output or 60 Hz input, 120 Hz output in the extreme cases).

Consequently, from time to time (the frequency of which depends on the difference in input versus output rates) an overflow or underflow condition occurs with respect to the two-frame buffer 8. When the output rate is higher than the input, which is usually the manner in which the invention is operated, the buffer will underflow from time to time requiring a frame to be repeated. Overflow causes a frame to be skipped. In order to continuously read out from memory 8 at the display frame rate while writing into the memory at the deinterlaced frame rate while avoiding tearing, the skipping or repeating of frames requires proper control.

Such control is provided by collision detector 14. Two outputs from detector 14 control the manner in which video frames are read into and out of the two-frame memory 8. The horizontal synchronization (H) pulses from VCO 6, or a clock signal derived from them, is applied to memory 8 as its write clock. The vertical synchronization (V) pulses from VCO 6 are applied to collision detector 14. The horizontal synchronization (H) pulses from VCO 12, or a clock signal derived from them, is applied to memory 8 as its read clock. The vertical synchronization (V) pulses from VCO 12 are applied as the other input to collision detector 14.

FIG. 2A shows the collision control functional arrangement in more detail. Memory 8 has two parallel one-frame memory stores 16 and 17, arbitrarily designated "odd" and "even." The outputs of collision detector 14 control whether the video input from deinterlacer 2 is applied to the odd memory 16 or the even memory 17 and whether the video output is taken from the odd memory or the even memory. Control of the writing and reading of video frames is shown functionally by switches 18 and 19. A frame memory is never read while it is being written to. Successive frames of the input video from deinterlacer 2 are alternately read into the odd and even frame memories 16 and 17 when the input frame rate is slower than the output frame rate. However, depending on the differences in frame rates, from time to time the collision detector causes the odd frame memory or the even frame memory to be read twice. When the output frame rate is slower than the input frame rate (an unusual occurrence, as mentioned above), the collision detector, from time to time, causes an input frame to be skipped and not written to a frame memory. The collision detector and control constitute means for writing said progressively-scanned video frames into said video frame memory means at a rate derived from the timing of the progressively-scanned video frames and for reading said progressively-scanned video signals out of said video frame memory means at a rate derived from the timing of the monitor's frame rate.

The operation of FIG. 2A may be better understood by reference to the timing information chart shown in FIG. 2B. The reference points A through C, G and J in FIG. 2A correspond to the respectively designated in FIG. 2B. The input video frames at point A are a succession of frames—frames 1 through 5 are shown. The odd frames at B are written to the odd frame memory 16 and the even frames at C are written to the even frame memory 17. The memory write switch control G from collision detector 14 alternates at the input frame rate. The output frame rate (V from VCO 12) is shown for reference. Input frame 1 cannot be read until it has been written. Thus, at time $t_1$ the memory read switch control J causes the odd memory to be read. At the conclusion of the first output frame time at $t_2$, the even memory is still being written to. Accordingly, control J does not switch and the contents of the odd memory are read out a second time until time $t_3$ when the even memory may be read out. The pattern thus continues as shown.

Two-frame-buffer memory and control arrangements are known in the prior art as noted above. Another example of a similar video frame buffer write/read sequence controller is described in U.S. Pat. No. 5,327,243, which is hereby incorporated by reference in its entirety. However, the prior art did not recognize the combination of such a memory and control with a progressively-scanned input video signal to the memory which has repeating frames, such as is provided when a film source interlaced television signal is properly deinterlaced.

When the display monitor's refresh rate is at least as high as the deinterlaced frame rate and is not more than twice the deinterlaced frame rate (i.e., about 100 Hz for a nominally 50 Hz source and about 120 Hz for a nominally 60 Hz source), every film frame is represented by two, three, four or five progressively-scanned video display frames. Various repetition patterns of two and/or three and/or four identical and/or five deinterlaced frames result depending on the relative input and output frame rates and their relative phases. The inventors have found that the resulting somewhat random repetition patterns are psychovisually acceptable despite their departure from conventional 2-2 and 3-2 film source video frame patterns. The resulting repetition patterns result in the same film frame having time durations which are not significantly different from the time durations of film frames occurring in conventional 3-2 pulldown displays. The resulting displays, even for worst case 5-2 patterns, have no psychovisually apparent motion discontinuities.

Some liquid crystal display (LCD) portable computers operate with screen refresh rates under 60 Hz (56 Hz, for example) and have an output port for feeding an external monitor. In such a situation, for a 60 Hz video source, the output frame rate is less than the deinterlaced frame rate, resulting, from time to time, in skipping a frame and, consequently, the display of only one deinterlaced frame corresponding to a film frame. While some psychovisual perceptible motion discontinuity results, it is barely perceptible and is largely obscured by the low-frame-rate display flicker. Thus, display rates less than the deinterlaced frame rate may be marginally acceptable, but are not preferred.

Additional timing charts are useful in demonstrating the operation of the present invention. Such timing charts are shown in FIGS. 3–11. In each of the timing charts an output frame is a time-compressed version of the last input frame to be applied to the write-section of the memory before beginning reading the memory for the output data. In all of the examples of FIGS. 2–11, motion in the displayed picture is smooth.

In FIG. 3, a 60 Hz (field rate) interlaced video signal from a film source is converted to a 72 Hz (frame rate) progressive-scan video signal. The resulting output is either a succession of 2 and 4 frames, 2, 4 and 3 frames, or 3 frames of the original film. Motion in the displayed picture is smooth. In this Figure and in FIGS. 4–11, A1=A2, B1=B2=B3, C1=C2, etc. The numbers following letters (e.g., A1) are intended only to indicate from which source input frame a given output frame comes.

In FIG. 4, a 60 Hz (field rate) interlaced video signal from a film source is converted to a 75 Hz (frame rate) progressive-scan video signal. The resulting output is a succession of 2, 3 or 4 frames of the original film.

In FIG. 5, a 50 Hz (field rate) interlaced video signal from a film source is converted to a 60 Hz (frame rate) progressive-scan video signal. The resulting output is a succession of 2 or 3 frames of the original film. Because the film source is at 25 Hz (instead of 24 Hz) there are more 2's than 3's. There is never a sequence with two consecutive 3's.

In FIG. 6, a 50 Hz (field rate) interlaced video signal from a film source is converted to a 72 Hz (frame rate) progressive-scan video signal. The resulting output is a succession of 2 or 3 frames of the original film. There are more 3's than 2's. There is never a sequence with two consecutive 2's.

In FIG. 7, a 50 Hz (field rate) interlaced video signal from a film source is converted to a 75 Hz (frame rate) progressive-scan video signal. The resulting output is a succession of 3 frames of the original film. If $F_{out}$ is less than 75 Hz, there will be an occasional two frames sequence. If $F_{out}$ is greater than 75 Hz, there will be an occasional four frame sequence.

In FIG. 8, a 50 Hz (field rate) interlaced video signal from a film source is converted to a 75 Hz (frame rate) progressive-scan video signal. The resulting output is a succession of 3, 4 or 5 frames of the original film.

In FIG. 9, a randomly selected unusual ratio is shown: a 50 Hz (field rate) interlaced video signal from a film source is converted to a 70 Hz (frame rate) progressive-scan video signal. In this example, there is never more than 3 frames nor less than 2 of the original film.

In FIG. 10, the input is a 60 Hz (field rate) interlaced video signal from a film source and the output is a is 60 Hz (frame rate) progressive-scan video signal. The 3/2 pulldown ratio is always respected.

In FIG. 11, the input is a 60 Hz (field rate) interlaced video signal from a film source and the output is a is 66 Hz (frame rate) progressive-scan video signal. The output sequences are most easily analyzed in a table:

| Phase | Frames | Frames | Period  | Period  |
|-------|--------|--------|---------|---------|
| 1     | 3      | 3      | 45.5 ms | 30.3 ms |
| 2     | 2      | 4      | 30.3 ms | 60.6 ms |
| 3     | 2      | 3      | 30.3 ms | 45.5 ms |
| 4     | 2      | 3      | 30.3 ms | 45.5 ms |
| 5     | 2      | 3      | 30.3 ms | 45.5 ms |

"Phase" indicates five possible timing variations. There is one chance in five for the period of a reproduced film frame to exceed 60 ms (the true film 24 fps period is 41.6 ms).

The 3/2 or 2/2 pulldown timing knowledge may be used to optimize output motion by minimizing differences between video frame periods. Deinterlacer 2 has at its disposal the knowledge of the sequence timing at 50 Hz (2 frames) or 60 Hz (2+3 frames). The sequence start pulse may be used to optimize the output motion. For example, in the case of 60 Hz to 72 Hz, shown in the timing chart of FIG. 3, choose the third output case; in the case of 60 Hz to 66 Hz, shown in the timing chart of FIG. 11, avoid the second output sequence.

Some general observations may be made with regard to the case of an input signal which is a 60 Hz interlaced television signal having a film source. Proper deinterlacing (taking into account the film source) results in providing an input to the memory which is a sequence of two identical frames (corresponding to one film frame in the source) followed by three identical frames (corresponding to the next film frame in the source). That is, five progressive-scan frames represent two consecutive film frames. Each video frame has a period of 1/60 sec or 16.6 ms. Thus, at the input to the two-frame memory, one film frame is represented by either two video frames having a display time period of 33.3 ms or three video frames having a period of 50 ms.

In order to maintain the appearance of smooth motion in the displayed picture, the output of the memory should not shorten too much the "short" (33.3 ms) frame display period and should not lengthen too much the "long" (50 ms) frame display period. For display frequencies above 60 Hz, it is not possible to "miss" a video frame (each display video frame is less than 16.6 ms in length)—thus, the short frame display period will always be at least the period of two video frames at the output frame rate. For frequencies between 60 hz and 72 Hz, the system displays a combination of 3/2 pulldown ratios and either 3/3 or 2/4 ratios. The probability of a 4th frame lengthening the "long" display is low if F is closer to 60 hz than 72 Hz and high in the opposite case. Thus, for display frequencies up to 72 Hz, the short frame display period may be extended by one video frame to a length of three video frames at the output frame rate and the long frame display period may also be extended by one video frame to a length of four video frames at the output frame rate. At 72 Hz, the period of one video frame is 13.88 ms. Thus, the shortest frame display period will be 2×13.88=27 ms and the longest frame display period will be 4×13.88=55.5 ms. These film frame periods are not substantially different from the "true" film frame period of 41.6 ms nor from the accepted 3-2 pull down values of 33.3 ms and 50 ms, respectively.

FIG. 12 is a graph showing the probability of an extra video frame output as a function of output frequency for a 60 Hz input signal. FIG. 13 is a graph showing the duration of an extra video frame as a function of output frequency for a 60 Hz input signal. The result is an appearance of smooth motion in the displayed picture. For frequencies above 72 Hz, the lengthening is less because each video output frame period is shorter (for example, 75 Hz the video frame period is 13.3 ms).

In the case of an input signal which is a 50 Hz interlaced television signal having a film source, the input to the memory is a sequence of two identical 20 ms video frames (40 ms total) coming from each source film frame. For display frequencies above 60 Hz (display frequencies as low as 50 Hz are unlikely) it is impossible to "miss" a video frame—thus, each frame display period will always be at least the period of two video frames at the output frame rate. Conversely, for display frequencies up to 100 Hz, each film frame display period is no more than three video frame periods. The worst case is conversion to 60 hz where the 3/2 pulldown ratio is reinvented by the memory. Thus, no original film frame can be displayed for more than 50 ms nor less than 33.3 ms, for all output frame rates from 60 Hz to 100 Hz. The result is an appearance of smooth motion in the displayed picture.

Thus, in accordance with the teachings of the present invention, a 50 Hz or 60 Hz video data rate, originated from film, where deinterlacing has been performed by proper film recognition, and where therefore at least two video frames applied to the frame buffer memory input are identical, will be displayed on a computer-type screen at any frequency equal to or above 60 Hz without psychovisually apparent motion discontinuity.

A functional block diagram of a preferred embodiment of the invention which includes additional features is shown in FIG. 14. The embodiment of FIG. 14 adds a scaler 20, switcher 22 and microprocessor controller 24 to the basic embodiment of FIG. 1. Scaler 20 provides control over the size and positioning of the video display on the display monitor (not shown). Such means for controlling display size and display location are well known in the prior art. See, for example, the above-cited U.S. Pat. No. 5,327,243 and Chapter 2 (pages 7–26) of the above-cited textbook video Demystified. Switcher 22, shown functionally as a double-pole, double-throw switch, toggles the final output between the processed video source and the second source, such as a conventional computer graphics output. A microprocessor may control the scaler and switcher as may be desired by the user. Techniques for mixing computer graphics and video sources on a computer-type display monitor are known. Video may be displayed so that it appears to be over or under computer generated displays. See, for example, embodiments in the *Video Demystified* text which employ chroma keying to insert video into graphics displays.

As mentioned above, it is essential that the input video to the frame buffer memory have at least two consecutive progressively-scanned video frames derived from the same film frame. If, instead, consecutive frames of the progressively-scanned video source have different motion content (i.e., a "non-film" source), the absence of motion discontinuity in the output display achieved with the arrangements of FIGS. 1 and 14 may be lost. If the difference is small, such as 60 Hz vs. 60.1 Hz, the disruption happens infrequently. When the output is at a faster rate than the input, frames are duplicated and there is a stop motion effect. If the output is at a slower rate, frames are skipped, causing a jump in the motion. The worst case, psychovisually, is for the common condition in which the input video is nominally 60 Hz and the display refresh rate is about 72 or 75 Hz. On the other hand, a nominal 50 Hz input with a 75 Hz output looks no worse than, for example, a film source converted to video with a conventional 3-2 video (there would be 25 extra frames). Outputs at a 100 Hz refresh rate for nominally 50 or 60 Hz inputs would look very good (a double image at 100 Hz is so close together temporally as to appear to be a single image). Motion discontinuities are most visible with respect to repeatable motion (such as a pendulum) or continuous motion (such a rolling ball).

There are a number of ways to handle non-film sources in which consecutive frames of the progressively-scanned video source have different motion content. One way is simply to tolerate the skipped or stopped frames. As just described, the psychovisual effect may be acceptable for many input to output frame ratios. In that case, the embodiments of FIGS. 1 and 14 are usable for both film sources and non-film sources. However, it is preferred to optionally add additional processing subsequent to the frame buffer memory 8 such as in the manner shown in the functional block diagram of FIG. 15.

In the embodiment of FIG. 15, two successive frames are averaged by a video processor 22 which receives the outputs of the two frame buffers (holding frame "n" and frame "n+1", the "odd" and "even" frames) comprising memory 8. Instead of causing the memory to skip a frame or add a frame, collision detector 14' causes the video processor 22 instead to average two consecutive frames. The result of averaging is to defocus the picture in the temporal domain. Although this results in double imaging, the motion becomes smooth and is acceptable for most pictures. Better results, although at higher cost, may be obtained by averaging over three or more frames instead of two and by using different weightings for the averaged frames. Three frames with ¼, ½, ¼ may be the optimum cost/benefit selection. Such processing techniques are well known.

A more complex and expensive approach is to use motion vectors in order to create new frames by interpolation. An adaptive arrangement may be used which selects averaging or interpolation depending on picture conditions. Such techniques are also well known in the prior art.

Another alternative is to modify the non-film source frames such that they appear to be from a film source. Interlaced television signals originated at 60 Hz or 50 Hz by a video camera preferably are processed as follows:

1) Deinterlacing is performed by any of various well known conventional techniques in order to provide progressively-scanned frames having more lines than in each interlaced field. Often the number of lines is doubled and the deinterlacer is referred to as a "line doubler." Such deinterlacing is typically accomplished by processing individual fields to increase their number of lines (as by line duplication or interpolation) or by the processing more than one field so as to combine elements of two or more fields. Adaptive techniques may be employed to vary the manner of deinterlacing in response to motion and or picture characteristics. Many such techniques are well known in the prior art.

2) An artificial film sequence is created by combining successive frames of line doubled video so that at least 2 successive frames are identical: 3/2 at 60 Hz or 2/2 at 50 Hz. The 2/2 sequence is preferred.

3) There will be no motion discontinuity at the memory output for the same reasons that there is no motion discontinuity for film. Some slight motion blurring (as for film) will be introduced.

FIG. 16 is a functional block diagram showing the manner in which an artificial film sequence may be created. FIG. 17 is a timing diagram useful in understanding the operation of FIG. 16. The input to an on/off switch 26 is taken from the output of a conventional deinterlacer as described above. Switch 26 is operated at the frame rate of the deinterlaced 50 or 60 Hz flame rate progressively-scanned video signal. The deinterlaced video is shown having frames A, B, C, etc. in FIG. 17. Each frame is ⅟₅₀ sec (20 ms) for a 50 Hz input or ⅟₆₀ sec (16.6 ms) for a 60 hz input. Switch 26 causes every other frame to be omitted. Thus, the input to the one-frame memory store 28 at point (1) is shown as frames A, C, E, etc., with frames B, D, F, etc. omitted. The frame store output at point (2) is a one-frame delayed version of its input at point (1). The frame input and outputs are additively summed in combiner 30 to produce a succession of frames A, A, C, C, E, E, etc.

The output for combiner 30 is then applied to memory 8 of the arrangement of FIG. 1 or to scaler 20 of the arrangement of FIG. 14. The outputs of memory 8 in either embodiment are, for example, as shown in the timing diagrams of FIGS. 3, 4, 5, 6, 7 or 9.

The mode of operation described in connection with FIGS. 16 and 17 should be inhibited if the source is a film or if the input and output frame rates are identical. It is also believed to be desirable to inhibit this mode of operation if the output frame rate is between about 1.5 and 2 times the input frame rate. As discussed above, a nominal 50 Hz input with a 75 Hz output looks no worse than, for example, a film source converted to video with a conventional 3-2 video (there would be 25 extra frames), while outputs at a 100 Hz refresh rate for nominally 50 or 60 Hz inputs would look very good (a double image at 100 Hz is so close together temporally as to appear to be a single image). The cases of 75 and 100 Hz outputs from a 50 Hz source are depicted in the timing diagram of FIG. 18.

Although, in general the processing of chrominance video signal components is not as critical as the processing of luminance video signal components, for the sake of simplicity in implementation, luminance and chrominance video components may both be separately processed in the same way by the various elements of the invention.

The present invention may be implemented using analog, digital, hybrid analog/digital and/or digital signal processing in which functions are performed in software and/or firmware. Digital equivalents of analog devices may be employed (for example, a digitally controlled oscillator in place of a voltage controlled oscillator).

We claim:

1. Apparatus for converting a television signal to a form suitable for display on a progressively-scanned variable-frame-rate high-resolution monitor, comprising means for generating a succession of progressively-scanned video frames wherein each frame is repeated at least twice in succession, video frame memory means for storing at least two progressively-scanned video frames, and means for writing said progressively-scanned video frames into said video frame memory means at the frame rate of the progressively-scanned video frames and for reading said progressively-scanned video signals out of said video frame memory means at the monitor's frame rate, wherein the frame rate of the progressively-scanned video frames is less than the monitor's frame rate.

2. Apparatus according to claim 1 wherein said means for generating a succession of progressively-scanned video frames comprises means receiving a conventional 2-1 interlaced, nominally 50 Hz field rate or a conventional 2-1 interlaced, nominally 60 Hz field rate television signal for deinterlacing said nominally 50 Hz or nominally 60 Hz television signal when the original video source is a progressively-scanned source having a frame rate less than the frame rate of the interlaced television signal and every progressively-scanned source frame is represented by at least two consecutive interlaced fields, by merging opposite polarity pairs of interlaced fields derived from the same motion picture film frame, each such merged pair constituting a new deinterlaced frame repeated at least twice so that the deinterlaced signal has a frame rate the same as the original interlaced television field rate.

3. The apparatus of claim 2 further comprising scaling means in the signal path between said means for deinterlacing and said video frame memory means for controlling the size and location of said deinterlaced video signals displayed on said monitor.

4. The apparatus of claim 2 further comprising means for combining deinterlaced video signals from said video frame memory means with graphics signals from a computer whereby said monitor displays both video and graphics signals.

5. Apparatus according to claim 1 wherein said means for generating a succession of progressively-scanned video frames comprises means receiving a conventional 2-1 interlaced, nominally 50 Hz field rate or a conventional 2-1 interlaced, nominally 60 Hz field rate television signal for deinterlacing said nominally 50 Hz or nominally 60 Hz television signal when the original video source is a non-film video source so that the deinterlaced signal has a frame rate the same as the original interlaced television field rate, and means for establishing an artificial film sequence by repeating successive frames of said progressively-scanned video so that patterns of two successive identical frames are generated or patterns of three followed by two successive identical frames are generated, one frame being omitted when two successive frames are identical and two frames being omitted when three successive frames are identical.

6. Apparatus according to claim 1 wherein said means for generating a succession of progressively-scanned video frames comprises means receiving a progressively-scanned television signal for increasing the frame rate of said progressively-scanned television signal by repeating successive frames of said progressively-scanned television signal.

7. Apparatus according to claim 6 wherein a nominally 24 Hz frame rate progressively-scanned television signal is received and increased to a nominally 48 Hz frame rate by repeating each receive frame twice.

8. Apparatus according to claim 6 wherein a nominally 24 Hz frame rate progressively-scanned television signal is received and increased to a nominally 60 Hz frame rate by employing a 32 repetition pattern in which three followed by two successive identical frames are generated.

9. Apparatus according to claim 6 wherein a nominally 25 Hz frame rate progressively-scanned television signal is received and increased to a nominally 50 Hz frame rate by repeating each receive frame twice.

10. Apparatus for converting a television signal to a form suitable for display on a progressively-scanned variable-frame-rate high-resolution monitor, comprising means receiving a succession of progressively-scanned video frames wherein each frame is repeated at least twice in succession, video frame memory means for storing at least two progressively-scanned video frames, and means for writing said progressively-scanned video frames into said video frame memory means at a rate derived from the timing of the progressively-scanned video frames and for reading said progressively-scanned video signals out of said video frame memory means at a rate derived from the timing of the monitor's frame rate.

11. Apparatus according to claim 8 wherein the frame rate of the monitor is within the range of about 60 Hz to about 120 Hz and said means for writing progressively-scanned video frames into said video frame memory means and for reading progressively-scanned video signals out of said video frame memory means causes additional repetitions of said progressively-scanned video frames for monitor frame rates above 60 Hz.

12. Apparatus according to claim 8 wherein the frame rate of the monitor is less than 60 Hz and said means for writing progressively-scanned video frames into said video frame memory means and for reading progressively-scanned video signals out of said video frame memory means causes skipping ones of said progressively-scanned video frames.

13. Apparatus according to claim 9 wherein the frame rate of the monitor is within the range of about 50 Hz to about 100 Hz and said means for writing progressively-scanned video frames into said video frame memory means and for reading progressively-scanned video signals out of said video frame memory means causes additional repetitions of said progressively-scanned video frames for monitor frame rates above 50 Hz.

14. Apparatus according to claim 9 wherein the frame rate of the monitor is less than 50 Hz and said means for writing progressively-scanned video frames into said video frame memory means and for reading progressively-scanned video signals out of said video frame memory means causes skipping of ones of said progressively-scanned video frames.

15. A method for converting a television signal to a form suitable for display on a progressively-scanned variable-frame-rate high-resolution monitor, comprising
generating a succession of progressively-scanned video frames wherein each frame is repeated at least twice in succession,
storing at least two progressively-scanned video frames in a video frame memory, and
writing said progressively-scanned video frames into said video frame memory at the frame rate of the progressively-scanned video frames and reading said progressively-scanned video signals out of said video frame memory at the monitor's frame rate, wherein the frame rate of the progressively-scanned video frames is less than the monitor's frame rate.

16. A method according to claim 15 wherein said generating a succession of progressively-scanned video frames comprises
receiving a conventional 2-1 interlaced, nominally 50 Hz field rate or a conventional 2-1 interlaced, nominally 60 Hz field rate television signal and deinterlacing said nominally 50 Hz or nominally 60 Hz television signal when the original video source is a progressively-scanned source having a frame rate less than the frame rate of the interlaced television signal and every progressively-scanned source frame is represented by at least two consecutive interlaced fields, by merging opposite polarity pairs of interlaced fields derived from the same original video source progressively-scanned frame, each such merged pair constituting a new deinterlaced frame repeated at least twice so that the deinterlaced signal has a frame rate the same as the original interlaced television field rate.

17. A method according to claim 15 wherein said generating a succession of progressively-scanned video frames comprises
receiving a conventional 2-1 interlaced, nominally 50 Hz field rate or a conventional 2-1 interlaced, nominally 60 Hz field rate television signal and deinterlacing said nominally 50 Hz or nominally 60 Hz television signal when the original video source is a non-film video source so that the deinterlaced signal has a frame rate the same as the original interlaced television field rate, and
establishing an artificial film sequence by repeating successive frames of said progressively-scanned video so that patterns of two successive identical frames are generated or patterns of three followed by two successive identical frames are generated, one frame being omitted when two successive frames are identical and two frames being omitted when three successive frames are identical.

18. A method according to claim 15 wherein said generating a succession of progressively-scanned video frames comprises
receiving a progressively-scanned television signal and increasing the frame rate of said progressively-scanned television signal by repeating successive frames of said progressively-scanned television signal.

19. A method according to claim 18 wherein a nominally 24 Hz frame rate progressively-scanned television signal is received and increased to a nominally 48 Hz frame rate by repeating each receive flame twice.

20. A method according to claim 18 wherein a nominally 24 Hz frame rate progressively-scanned television signal is received and increased to a nominally 60 Hz frame rate by employing a 3-2 repetition pattern in which three followed by two successive identical frames are generated.

21. A method according to claim 18 wherein a nominally 25 Hz frame rate progressively-scanned television signal is received and increased to a nominally 50 Hz frame rate by repeating each receive frame twice.

22. A method for converting a television signal to a form suitable for display on a progressively-scanned variable-frame-rate high-resolution monitor, comprising
receiving a succession of progressively-scanned video frames wherein each frame is repeated at least twice in succession,
storing at least two progressively-scanned video frames in a video frame memory, and
writing said progressively-scanned video frames into said video frame memory at the frame rate of the progressively-scanned video frames and reading said progressively-scanned video signals out of said video frame memory at the monitor's frame rate, wherein the frame rate of the progressively-scanned video frames is less than the monitor's frame rate.

23. A method according to claim 20 wherein the frame rate of the monitor is within the range of about 60 Hz to about 120 Hz and progressively-scanned video frames are written into and read out of said video frame memory so as to cause additional repetitions of said progressively-scanned video frames for monitor frame rates above 60 Hz.

24. Apparatus according to claim 20 wherein the frame rate of the monitor is less than 60 Hz and progressively-scanned video frames are written into and read out of said video frame memory so as to cause deletions of ones of said progressively-scanned video frames.

25. Apparatus according to claim 21 wherein the frame rate of the monitor is within the range of about 50 Hz to about 100 Hz and progressively-scanned video frames are written into and read out of said video frame memory so as to cause additional repetitions of said progressively-scanned video frames for monitor frame rates above 50 Hz.

26. Apparatus according to claim 21 wherein the frame rate of the monitor is less than 50 Hz and progressively-scanned video frames are written into and read out of said video frame memory so as to cause deletions of ones of said progressively-scanned video frames.

27. Apparatus for converting a television signal to a form suitable for display on a progressively-scanned variable-frame-rate high-resolution monitor, comprising
a generator of a succession of progressively-scanned video frames wherein each frame is repeated at least twice in succession, a video frame memory storing at least two of said progressively-scanned video frames, and a controller writing said progressively-scanned video frames into said video frame memory at the frame rate of the progressively-scanned video frames and reading said progressively-scanned video signals out of said video frame memory at the monitor's frame rate, wherein the frame rate of the progressively-scanned video frames is less than the monitor's frame rate.

28. Apparatus according to claim 27 wherein said generator comprises a deinterlacer, receiving a conventional 2-1 interlaced, nominally 50 Hz field rate or a conventional 2-1 interlaced, nominally 60 Hz field rate television signal, deinterlacing said nominally 50 Hz or nominally 60 Hz television signal when the original video source is a progressively-scanned source having a frame rate less than the frame rate of the interlaced television signal and every progressively-scanned source frame is represented by at least two consecutive interlaced fields, by merging opposite polarity pairs of interlaced fields derived from the same motion picture film flame, each such merged pair constituting a new deinterlaced frame repeated at least twice so that the deinterlaced signal has a frame rate the same as the original interlaced television field rate.

29. The apparatus of claim 28 further comprising a scaler in the signal path between said deinterlacer and said video frame memory, the scaler controlling the size and location of said deinterlaced video signal s displayed on said monitor.

30. The apparatus of claim 28 further comprising a combiner combining deinterlaced video signals from said video frame memory with graphics signals from a computer whereby said monitor displays both video and graphics signals.

31. Apparatus according to claim 27 wherein said generator comprises a deinterlacer, receiving a conventional 2-1 interlaced, nominally 50 Hz field rate or a conventional 2-1 interlaced, nominally 60 Hz field rate television signal, deinterlacing said nominally 50 Hz or nominally 60 Hz television signal when the original video source is a non-film video source so that the deinterlaced signal has a frame rate the same as the original interlaced television field rate, and an artificial film sequence generator establishing an artificial film sequence by repeating successive frames of said progressively-scanned video so that patterns of two successive identical frames are generated or patterns of three followed by two successive identical frames are generated, one frame being omitted when two successive frames are identical and two frames being omitted when three successive frames are identical.

32. Apparatus according to claim 27 wherein said generator comprises a frame rate increaser, receiving a progressively-scanned television signal, increasing the frame rate of said progressively-scanned television signal by repeating successive frames of said progressively-scanned television signal.

33. Apparatus according to claim 32 wherein a nominally 24 Hz frame rate progressively-scanned television signal is received and increased to a nominally 48 Hz frame rate by repeating each receive frame twice.

34. Apparatus according to claim 32 wherein a nominally 24 Hz frame rate progressively-scanned television signal is received and increased to a nominally 60 Hz frame rate by employing a 3-2 repetition pattern in which three followed by two successive identical frames are generated.

35. Apparatus according to claim 32 wherein a nominally 25 Hz frame rate progressively-scanned television signal is received and increased to a nominally 50 Hz frame rate by repeating each receive frame twice.

36. Apparatus for converting a television signal to a form suitable for display on a progressively-scanned variable-frame-rate high-resolution monitor, comprising an input receiving a succession of progressively-scanned video frames wherein each frame is repeated at least twice in succession, a video frame memory storing at least two of said progressively-scanned video frames, and a controller writing said progressively-scanned video frames into said video frame memory at the frame rate of the progressively-scanned video frames and reading said progressively-scanned video signals out of said video frame memory at the monitor's frame rate, wherein the frame rate of the progressively-scanned video frames is less than the monitor's frame rate.

37. Apparatus according to claim 34 wherein the frame rate of the monitor is within the range of about 60 Hz to about 120 Hz and said controller writing progressively-scanned video frames into said video frame memory and reading progressively-scanned video signals out of said video frame memory causes additional repetitions of said progressively-scanned video frames for monitor frame rates above 60 Hz.

38. Apparatus according to claim 34 wherein the frame rate of the monitor is less than 60 Hz and said controller writing progressively-scanned video frames into said video frame memory and reading progressively-scanned video signals out of said video frame memory causes skipping ones of said progressively-scanned video frames.

39. Apparatus according to claim 35 wherein the frame rate of the monitor is within the range of about 50 Hz to about 100 Hz and controller writing progressively-scanned video frames into said video frame memory and reading progressively-scanned video signals out of said video frame memory causes additional repetitions of said progressively-scanned video frames for monitor frame rates above 50 Hz.

40. Apparatus according to claim 35 wherein the frame rate of the monitor is less than 50 Hz and said controller writing progressively-scanned video frames into said video frame memory and reading progressively-scanned video signals out of said video frame memory causes skipping of ones of said progressively-scanned video frames.

41. Apparatus for converting a television signal to a form suitable for display on a non-interlaced variable-frame-rate high-resolution monitor, comprising means for generating a succession of non-interlaced video frames wherein each frame is repeated at least twice in succession, video frame memory means for storing at least two non-interlaced video frames, and means for writing said non-interlaced video frames into said video frame memory means at the frame rate of the non-interlaced video frames and for reading said non-interlaced video signals out of said video frame memory means at the monitor's frame rate, wherein the frame rate of the progressively-scanned video frames is less than the monitor's frame rate.

42. Apparatus according to claim 41 wherein said means for generating a succession of non-interlaced video frames comprises means receiving a conventional 2-1 interlaced, nominally 50 Hz field rate or a conventional 2-1 interlaced, nominally 60 Hz field rate television signal for deinterlacing said nominally 50 Hz or nominally 60 Hz television signal when the original video source is a non-interlaced source having a frame rate less than the frame rate of the interlaced television signal and every non-interlaced source frame is represented by at least two consecutive interlaced fields, by merging opposite polarity pairs of interlaced fields derived from the same motion picture film frame, each such merged pair constituting a new deinterlaced frame repeated at least twice so that the deinterlaced signal has a frame rate the same as the original interlaced television field rate.

43. Apparatus according to claim 41 wherein said means for generating a succession of non-interlaced video frames comprises means receiving a conventional 2-1 interlaced, nominally 50 Hz field rate or a conventional 2-1 interlaced, nominally 60 Hz field rate television signal for deinterlacing said nominally 50 Hz or nominally 60 Hz television signal when the original video source is a non-film video source so that the deinterlaced signal has a frame rate the same as the original interlaced television field rate, and means for establishing an artificial film sequence by repeating successive frames of said non-interlaced video so that patterns of two successive identical frames are generated or patterns of three followed by two successive identical frames are generated, one frame being omitted when two successive frames are identical and two frames being omitted when three successive frames are identical.

44. Apparatus according to claim 41 wherein said means for generating a succession of non-interlaced video frames comprises means receiving a non-interlaced television signal for increasing the frame rate of said non-interlaced television signal by repeating successive frames of said non-interlaced television signal.

45. Apparatus for converting a television signal to a form suitable for display on a non-interlaced variable-frame-rate high-resolution monitor, comprising means receiving a succession of non-interlaced video frames wherein each frame is repeated at least twice in succession, video frame memory means for storing at least two non-interlaced video frames, and means for writing said non-interlaced video frames into said video frame memory means at the frame rate of the non-interlaced video frames and for reading said non-interlaced video signals out of said video frame memory means at the monitor's frame rate, wherein the frame rate of the progressively-scanned video frames is less than the monitor's frame rate.

46. A method for converting a television signal to a form suitable for display on a non-interlaced variable-frame-rate high-resolution monitor, comprising generating a succession on non-interlaced video frames wherein each frame is repeated at least twice in succession, storing at least two non-interlaced video frames in a video frame memory, and writing said non-interlaced video frames into said video frame memory at the frame rate of the non-interlaced video frames and reading said non-interlaced video signals out of said video frame memory at the monitor's frame rate, wherein the frame rate of the progressively-scanned video frames is less than the monitor's frame rate.

47. A method according to claim 46 wherein said generating a succession of non-interlaced video flames comprises receiving a conventional 2-1 interlaced, nominally 50 Hz field rate or a conventional 2-1 interlaced, nominally 60 Hz field rate television signal and deinterlacing said nominally 50 Hz or nominally 60 Hz television signal when the original video source is a non-interlaced source having a flame rate less than the frame rate of the interlaced television signal and every non-interlaced source frame is represented by at least two consecutive interlaced fields, by merging opposite polarity pairs of interlaced fields derived from the same motion picture film frame, each such merged pair constituting a new deinterlaced frame repeated at least twice so that the deinterlaced signal has a frame rate the same as the original interlaced television field rate.

48. A method according to claim 46 wherein said generating a succession of non-interlaced video frames comprises receiving a conventional 2-1 interlaced, nominally 50 Hz field rate or a conventional 2-1 interlaced, nominally 60 Hz field rate television signal and deinterlacing said nominally 50 Hz or nominally 60 Hz television signal when the original video source is a non-film video source so that the deinterlaced signal has a frame rate the same as the original interlaced television field rate, and establishing an artificial film sequence by repeating successive frames of said non-interlaced video so that patterns of two successive identical frames are generated or patterns of three followed by two successive identical frames are generated, one frame being omitted when two successive frames are identical and two frames being omitted when three successive frames are identical.

49. A method according to claim 46 wherein said generating a succession of non-interlaced video frames comprises receiving a non-interlaced television signal and increasing the frame rate of said non-interlaced television signal by repeating successive frames of said non-interlaced television signal.

50. A method for converting a television signal to a form suitable for display on a non-interlaced variable-frame-rate high-resolution monitor, comprising receiving a succession of non-interlaced video frames wherein each frame is repeated at least twice in succession, storing at least two non-interlaced video frames in a video frame memory, and writing said non-interlaced video frames into said video frame memory at the frame rate of the non-interlaced video frames and reading said non-interlaced video signals out of said video frame memory at the monitor's frame rate, wherein the frame rate of the progressively-scanned video frames is less than the monitor's frame rate.

51. Apparatus for converting a television signal to a form suitable for display on a non-interlaced variable-frame-rate high-resolution monitor, comprising a generator of a succession of non-interlaced video frames wherein each frame is repeated at least twice in succession, a video frame memory storing at least two of said non-interlaced video frames, and a controller writing said non-interlaced video frames into said video frame memory at the frame rate of the non-interlaced video frames and reading said non-interlaced video signals out of said video frame memory the monitor's frame rate, wherein the frame rate of the progressively-scanned video frames is less than the monitor's frame rate.

52. Apparatus according to claim 51 wherein said generator comprises a deinterlacer, receiving a conventional 2-1 interlaced, nominally 50 Hz field rate or a conventional 2-1 interlaced, nominally 60 Hz field rate television signal, deinterlacing said nominally 50 Hz or nominally 60 Hz television signal when the original video source is a non-interlaced source having a frame rate less than the frame rate of the interlaced television signal and every non-interlaced source frame is represented by at least two consecutive interlaced fields, by merging opposite polarity pairs of interlaced fields derived from the same motion picture film frame, each such merged pair constituting a new deinterlaced frame repeated at least twice so that the deinterlaced signal has a frame rate the same as the original interlaced television field rate.

53. Apparatus according to claim 51 wherein said generator comprises a deinterlacer, receiving a conventional 2-1 interlaced, nominally 50 Hz field rate or a conventional 2-1 interlaced, nominally 60 Hz field rate television signal, deinterlacing said nominally 50 Hz or nominally 60 Hz television signal when the original video source is a non-film video source so that the deinterlaced signal has a frame rate the same as the original interlaced television field rate, and an artificial film sequence generator establishing an artificial film sequence by repeating successive frames of said non-interlaced video so that patterns of two successive identical frames are generated or patterns of three followed by two successive identical frames are generated, one frame being omitted when two successive frames are identical and two frames being omitted when three successive frames are identical.

54. Apparatus according to claim 51 wherein said generator comprises a frame rate increaser, receiving a non-interlaced television signal, increasing the flame rate of said non-interlaced television signal by repeating successive frames of said non-interlaced television signal.

55. Apparatus for converting a television signal to a form suitable for display on a non-interlaced variable-frame-rate high-resolution monitor, comprising an input receiving a succession of non-interlaced video frames wherein each frame is repeated at least twice in succession, a video frame memory storing at least two of said non-interlaced video frames, and a controller writing said non-interlaced video frames into said video frame memory at the frame rate of the non-interlaced video frames and reading said non-interlaced video signals out of said video frame memory at the monitor's frame rate, wherein the frame rate of the progressively-scanned video frames is less than the monitor's frame rate.

\* \* \* \* \*